(12) United States Patent
Nagata et al.

(10) Patent No.: US 12,608,336 B2
(45) Date of Patent: Apr. 21, 2026

(54) SINGLE INSTRUCTION MULTIPLE DISPATCHES FOR SHORT KERNELS IN A RECONFIGURABLE PARALLEL PROCESSOR

(71) Applicant: AzurEngine Technologies Zhuhai Inc., Zhuhai (CN)

(72) Inventors: Toshio Nagata, Lake Elsinore, CA (US); Yuan Li, San Diego, CA (US); Jianbin Zhu, San Diego, CA (US)

(73) Assignee: AzurEngine Technologies Zhuhai Inc., Zhuhai (CN)

( * ) Notice: Subject to any disclaimer, the term of this patent is extended or adjusted under 35 U.S.C. 154(b) by 170 days.

(21) Appl. No.: 18/220,169

(22) Filed: Jul. 10, 2023

(65) Prior Publication Data

US 2025/0021516 A1     Jan. 16, 2025

(51) Int. Cl.
*G06F 15/80* (2006.01)
*G06F 9/355* (2018.01)
*G06F 9/38* (2018.01)

(52) U.S. Cl.
CPC ........ *G06F 15/8092* (2013.01); *G06F 9/3555* (2013.01); *G06F 9/3888* (2023.08)

(58) Field of Classification Search
CPC .. G06F 9/3888; G06F 15/8092; G06F 9/3555; G06F 9/325
USPC .......................................................... 712/3
See application file for complete search history.

(56) References Cited

U.S. PATENT DOCUMENTS

2018/0267932 A1* 9/2018 Zhu ........................ G06F 9/3001
2020/0004553 A1* 1/2020 Li .......................... G06F 9/3885

* cited by examiner

*Primary Examiner* — Keith E Vicary
(74) *Attorney, Agent, or Firm* — IPro, PLLC

(57) ABSTRACT

Processors, systems and methods are provided for executing multiple instances of a kernel by multiple segments of columns of a processor. A method may include retrieving kernel information of a kernel by a sequencer, retrieving instructions of the kernel from an instruction cache by the sequencer, repeatedly executing decoded scalar instructions of each instruction group of the kernel successively according to the number of instances of the kernel, repeatedly decoding vector instructions of each instruction group successively according to the number of instances of the kernel, and dispatching a respective configuration to a respective column after the first vector instruction decoding and each repetition of decoding with an amount of space between two subsequent dispatches equal to the number of columns that the kernel occupies.

20 Claims, 12 Drawing Sheets

PROCESS 1000

1002 — RETRIEVE KERNEL INFORMATION FOR A KERNEL BY A SEQUENCER

1004 — RETRIEVE INSTRUCTIONS OF THE KERNEL FROM AN INSTRUCTION CACHE BY THE SEQUENCER

1006 — REPEATEDLY EXECUTE DECODED SCALAR INSTRUCTIONS OF EACH INSTRUCTION GROUP SUCCESSIVELY ACCORDING TO THE NUMBER OF INSTANCES OF THE KERNEL

1008 — REPEATEDLY DECODE VECTOR INSTRUCTIONS OF EACH INSTRUCTION GROUP SUCCESSIVELY BY THE VECTOR INSTRUCTION DECODER ACCORDING TO THE NUMBER OF INSTANCES OF THE KERNEL

1010 — DISPATCH A RESPECTIVE CONFIGURATION TO A RESPECTIVE COLUMN AFTER THE FIRST DECODING AND EACH REPETITION OF DECODING

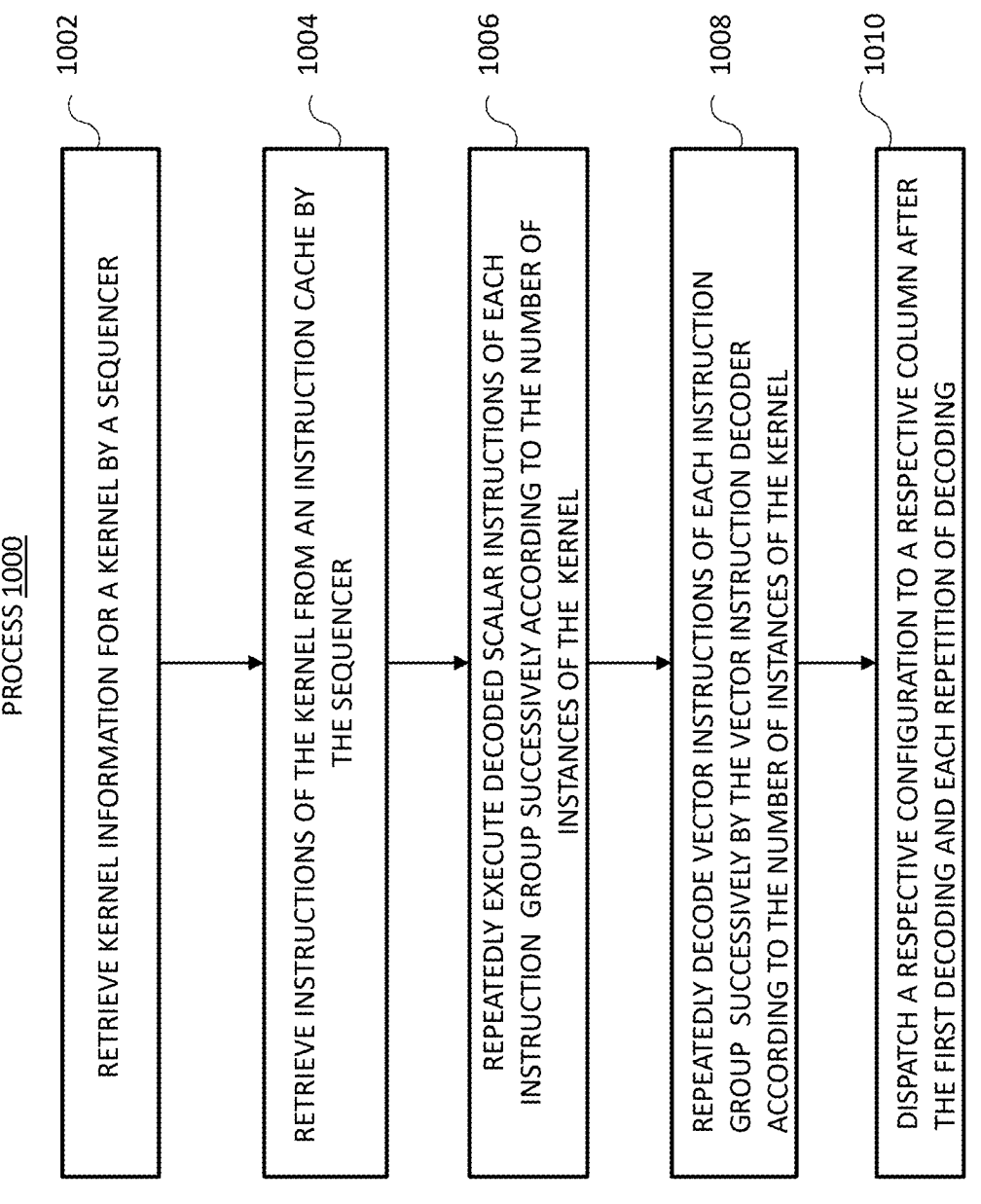

PROCESS 1000

1002
RETRIEVE KERNEL INFORMATION FOR A KERNEL BY A SEQUENCER

1004
RETRIEVE INSTRUCTIONS OF THE KERNEL FROM AN INSTRUCTION CACHE BY THE SEQUENCER

1006
REPEATEDLY EXECUTE DECODED SCALAR INSTRUCTIONS OF EACH INSTRUCTION GROUP SUCCESSIVELY ACCORDING TO THE NUMBER OF INSTANCES OF THE KERNEL

1008
REPEATEDLY DECODE VECTOR INSTRUCTIONS OF EACH INSTRUCTION GROUP SUCCESSIVELY BY THE VECTOR INSTRUCTION DECODER ACCORDING TO THE NUMBER OF INSTANCES OF THE KERNEL

1010
DISPATCH A RESPECTIVE CONFIGURATION TO A RESPECTIVE COLUMN AFTER THE FIRST DECODING AND EACH REPETITION OF DECODING

SINGLE INSTRUCTION MULTIPLE DISPATCHES FOR SHORT KERNELS IN A RECONFIGURABLE PARALLEL PROCESSOR

TECHNICAL FIELD

The disclosure herein relates to executing kernels in a multi-threaded computer architecture, particularly relates to a multi-threaded computer architecture that is adapted to instantiate multiple instances for one kernel and dispatches the multiple instances to multiple columns of processing units of one processor.

BACKGROUND

Graphics processing unit (GPU) architecture has provided a way to execute parallel threads in a Single Instruction Multiple Threads (SIMT) fashion. A SIMT processor such as a GPU has many cores configured to execute multiple threads simultaneously and is especially suitable for massive parallel computing applications. To take advantage of multiple cores for parallel execution, computer programs normally have to be tailored for the multi-core architecture by invoking functions of an Application Programming Interface (API) specifically designed to work on multiple cores. More recently, general-purpose computing on GPUs (GPGPU), which makes use of a GPU to perform computation in applications traditionally handled by the central processing unit (CPU), becomes more practical and popular.

Multi-thread computer instructions to be executed by a SIMT processor are generally packaged in kernels, such as Compute Unified Device Architecture (CUDA) kernels. During execution of the SIMT processor, the instructions of one kernel may be executed in parallel threads. Conventionally, if one kernel has to be repeatedly executed, the kernel has to be loaded, decoded and dispatched to the processing units of the SIMT processor for each repetition. This is very inefficient because there is a substantial overhead for loading and decoding the same kernel multiple times. Therefore, there is a need in the art for a processor to instantiate multiple instances for one loaded kernel and dispatches the multiple instances to multiple groups of processing units of one processor.

SUMMARY

The present disclosure describes apparatus, methods, and systems for efficiently performing scalar operations and massive parallel data processing in one processor. A processor according to various embodiments of the present disclosure may be designed to take advantage of massive thread level parallelism using programmable processing element array and let the scalar operations handled separately. As used herein, a scalar operation may refer to execution of a scalar instruction and a vector operation may refer to execution of a vector instruction.

In an exemplary embodiment, a processor may comprise a sequencer and a plurality of columns of vector processing units coupled to the sequencer. The sequencer may include: a scalar instruction decoder, a scalar processor, a vector instruction decoder, a local memory, and a scalar register file. The sequencer may be configured to retrieve kernel information of a kernel and retrieve instructions of the kernel from an instruction cache by the sequencer. The kernel information may include a number of instances of the kernel to fit in the processor, an address offset and a register index offset, a number of columns of vector processing units that the kernel occupies. The instructions of the kernel may include a plurality of instruction groups. The sequencer may be further configured to repeatedly execute scalar instructions of each instruction group of the kernel decoded by the scalar instruction decoder successively by the scalar processor according to the number of instances of the kernel, repeatedly decode vector instructions of each instruction group of the kernel successively by the vector instruction decoder according to the number of instances of the kernel, and dispatch a respective configuration to a respective column after a first vector instruction decoding and each repetition of decoding. A first execution of the decoded scalar instructions may use addresses in the local memory and scalar registers in the scalar register file specified by the kernel and each repetition of execution may use incremented addresses in the local memory with an increment amount being equal to the address offset multiplied by a respective repetition count and scalar registers with indexes incremented by the register index offset multiplied by the respective repetition count. The first vector instruction decoding may use the scalar registers specified by the kernel and each repetition of decoding may use the scalar registers with indexes incremented by the register index offset multiplied by the respective repetition count. Each respective configuration may be generated after decoding the vector instructions of the instruction group a respective time and dispatched to a respective column with an amount of space between two subsequent dispatches equal to the number of columns that the kernel occupies.

In another exemplary embodiment, a method may comprise retrieving kernel information of a kernel by a sequencer, retrieving instructions of the kernel from an instruction cache by the sequencer. The kernel information may include a number of instances of the kernel to fit in a processor, an address offset and a register index offset, a number of columns of vector processing units that the kernel occupies. The instructions of the kernel may include a plurality of instruction groups. The method may further comprise repeatedly executing decoded scalar instructions of each instruction group of the kernel successively according to the number of instances of the kernel, repeatedly decoding vector instructions of each instruction group of the kernel successively according to the number of instances of the kernel, and dispatching a respective configuration to a respective column after a first vector instruction decoding and each repetition of decoding. A first execution of the decoded scalar instructions may use local memory addresses and scalar registers specified by the kernel and each repetition of execution may use incremented addresses in the local memory with an increment amount being equal to the address offset multiplied by a respective repetition count and scalar registers with indexes incremented by the register index offset multiplied by the respective repetition count. The first vector instruction decoding may use the scalar registers specified by the kernel and each repetition of decoding may use the scalar registers with indexes incremented by the register index offset multiplied by the respective repetition count. Each respective configuration may be generated after decoding the vector instructions of the instruction group a respective time and dispatched to a respective column with an amount of space between two subsequent dispatches equal to the number of columns that the kernel occupies.

BRIEF DESCRIPTION OF FIGURES

FIG. 10 is a flowchart of a method for dispatching multiple instances of a short kernel in accordance with an embodiment of the present disclosure.

DETAILED DESCRIPTION

Figure 1:
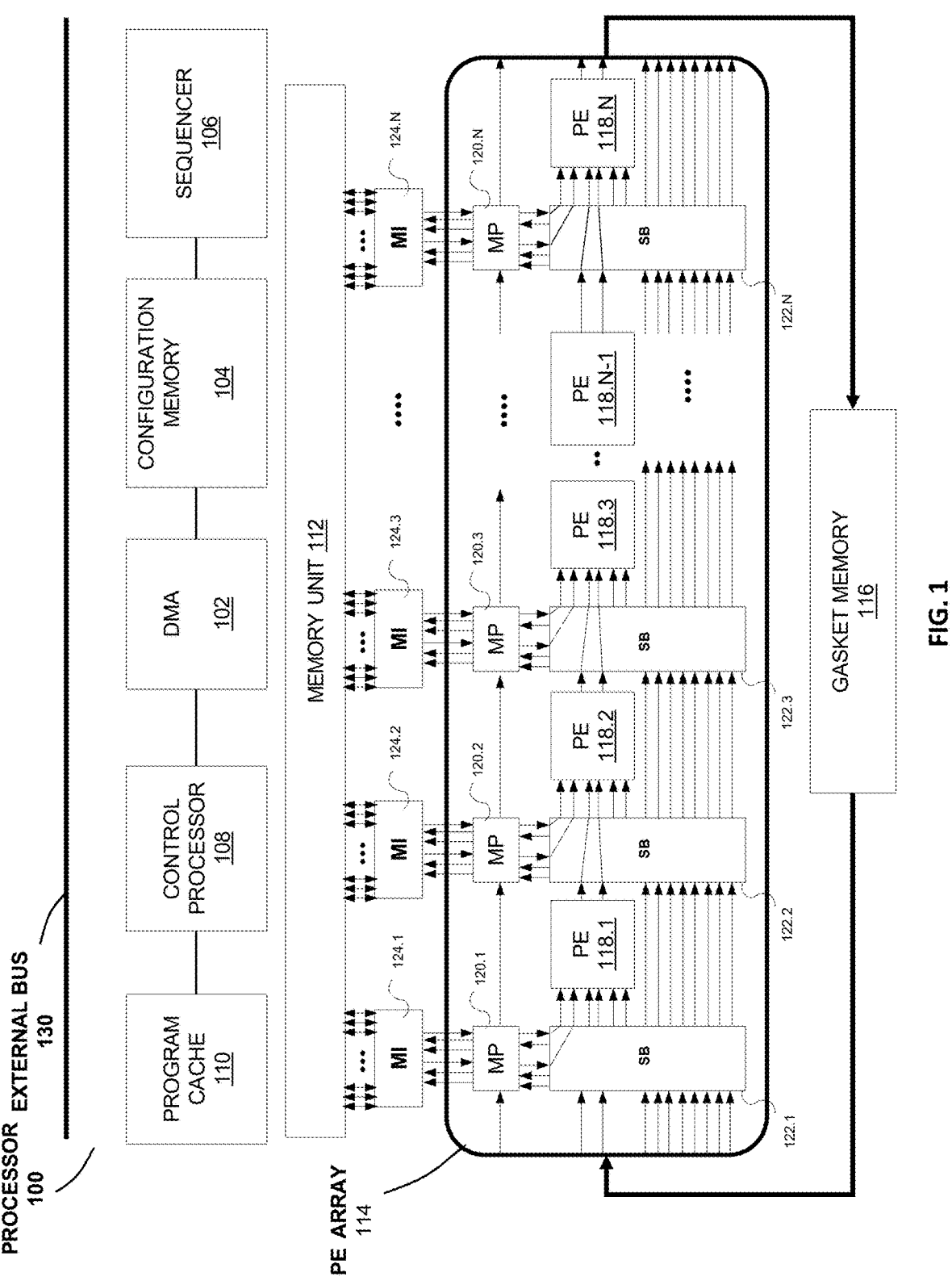
FIG. 1 schematically shows a processor in accordance with an embodiment of the present disclosure.

Reference will now be made in detail to the embodiments of the present teaching, examples of which are illustrated in the accompanying drawings. Like elements in the various figures are denoted by like reference numerals for consistency. While the present teaching will be described in conjunction with the embodiments, it will be understood that they are not intended to limit the present teaching to these embodiments. On the contrary, the present teaching is intended to cover alternatives, modifications, and equivalents, which may be included within the spirit and scope of the present teaching as defined by the appended claims. In addition, in the following detailed description of embodiments of the present teaching, numerous specific details are set forth in order to provide a thorough understanding of the present teaching. However, it will be recognized by one of ordinary skill in the art that the present teaching may be practiced without these specific details. In other instances, well-known methods, procedures, components, and circuits have not been described in detail as not to unnecessarily obscure aspects of the embodiments of the present teaching.

FIG. 1 schematically shows a processor 100 according to an embodiment of the present disclosure. The processor 100 may comprise a direct memory access (DMA) module 102, a configuration memory 104, a sequencer 106, a control processor 108, a program cache 110, a memory unit 112, a plurality of memory interfaces 124.1-124.N, a PE array 114 and a gasket memory 116. The DMA module 102 may be coupled to an external bus 130 and may be controlled by the control processor 108. The DMA module 102 may be responsible to move executable instructions and non-executable data in and out from the external bus 130. The program cache 110 may store instructions and data to be used by the control processor 108 to control the operation of the DMA module 102. In one embodiment, the instructions and data stored in the program cache 110 may be used by the control processor 108 to handle sequencer programs.

In some embodiments, the processor 100 may be configured for massive thread level parallel processing. For example, one processing element (PE) in the PE array 114 may comprise a vector Arithmetic Logic Unit (ALU) with a vector size more than one and each ALU of a vector ALU may be configured to perform same operation but on different data (e.g., each thread may operate on its own data). That is, in these embodiments with multiple ALUs, each PE may be configured to operate in a Single Instruction Multiple Threads (SIMT) fashion. In one embodiment, a PE with multiple vector data inputs may generate one vector data output. In some embodiments, a thread may also be referred to as a stream.

To provide data for multiple threads to be executed concurrently, in some embodiments, some relevant electronic connections between components of the processor 100 may be in vectors. For example, a vector address connection of K×G bits may have K number of G-bit addresses and a vector data connection of K×M bits may have K number of M-bit words data. It should also be noted that although not shown in any of the figures, data or address connections between different components may be accompanied by one or more signal lines. For example, a busy signal line may exist between a first component and a second component, and may be used by the first component to send a busy signal to the second component indicating that the first component is not ready to accept valid data or address signals. Moreover, a valid signal line may also exist between the first and second components, and may be used by the second component to send a valid signal to the first component indicating that valid data or address signals have been put on the connection wires.

The configuration memory 104 may store data path programs including arithmetic and logical instructions, and load and store instructions for data path components. In one embodiment, the data path programs stored in the configuration memory 104 may be sequence(s) of compiled instructions. For example, a data path program may include instructions to be executed by the PE array 114, which may specify what kind of operations PEs may perform, and how data path components may hold or transmit data.

The sequencer 106 may decode the instructions stored in the configuration memory 104. The instructions may include scalar instructions and vector instructions. For a scalar instruction, the sequencer 106 may decode the scalar instruction and perform the scalar operation coded by the scalar instruction. For a vector instruction, the sequencer 106 may decode the vector instruction and deliver the decoded vector instruction to various components of the PE array 114 (e.g., components of the PE array 114 that will be involved in arithmetic and logical operations, and data movement operations), such that the vector operations coded by the vector instruction may be performed by the components of the PE array 114. These components of the PE array 114 may also be referred to as vector processing units. As used herein, a scalar operation may refer to execution of a scalar instruction and a vector operation may refer to execution of a vector instruction.

The decoded vector instruction may be delivered to various components in a package, which may be referred to as a configuration package or simply a configuration. In addition to the decoded instruction, a configuration package for one component may include some other parameters (e.g., the number of warps specifying how many times an instruction is to be repeatedly executed and how many times data passes through a data switching unit in one configuration setting, and immediate values passed from the sequencer to the component). As used herein, a warp may refer to a number of threads concurrently executed in one PE, for example, for a PE with 32 ALUs, a warp may refer to 32 threads executed in parallel by a PE. In one embodiment, a physical data path configuration may be referred to as a physical data path program, which may comprise individual configurations for various components included in a physical data path.

Although not shown, there may be a configuration bus connecting the sequencer 106 to the components of the PE array 114 for individual configurations to be delivered to these components via the bus. For example, there may be a configuration bus for delivering the configurations for the memory ports, switch boxes and PEs. In some embodiments, the configuration for the memory ports may include data preparation instructions, such as but not limited to, LOAD/ STORE instructions (and parameters, such as addresses, for the instructions), and the configuration for the PEs may include instructions to be executed by the ALUs in the PEs, such as but not limited to, data crunching instructions like addition or subtraction.

The memory unit 112 may be a data staging area to store data received from the external bus 130 and also execution result data generated by the PE array 114 (before these results may be transmitted away via the external bus 130). In some embodiments, the memory unit 112 may be an in-processor cache for a large memory system external of the processor 100.

The PE array 114 may comprise a plurality of memory ports (MPs) 120.1-120.N, a plurality of switch boxes (SBs) 122.1-122.N, and a plurality of processing elements (PEs) 118.1-118.N. These components may form N columns of programmable hardware units or programmable hardware components. For example, the MP 120.1, SB 122.1, and PE 118.1 may form the first column of the PE array 114, and the MP 120.N, SB 122.N, and PE 118.N may form the Nth column of the PE array 114. Each column of programmable hardware units may also be referred to as a column of vector processing units or simply a column in an embodiment in which each of these hardware units is configured for vector processing. In the example shown in FIG. 1, the PE array 114 may comprise one row of processing elements 118.1-118.N, which may include N PEs with N being an integer number. In the embodiments described herein, the number N may be 32. But this is an example and it may be another integer number in other embodiments, such as, but not limited to, 16, 64, etc. Although these example numbers given may be power of 2, the number of PEs in one row need not be a power of 2 in one embodiment.

The plurality of MPs 120.1-120.N may be programmable hardware units controlling data flow between the PE array 114 and the memory unit 112. As shown in FIG. 1, the plurality of MPs 120.1-120.N may be coupled to the memory unit 112 via the plurality of memory interfaces (MIs) 124.1-124.N. Each MP 120.1-120.N may be coupled to the memory unit 112 via a respective MI 124.1-124.N to read from and write to the memory unit 112. Thus, the MI 124.1 may be the gateway to the memory unit 112 for the first column of PE array 114, and so on until the MI 124.N may be the gateway to the memory unit 112 for the N-th column of PE array 114. Each MP 120.1-120.N may also be coupled to a SB in a respective column to transmit data to and from each column. For example, MP 120.1 may be coupled to SB 122.1, MP 120.2 may be coupled to SB 122.2, and so on. In some embodiments, the memory unit 112 and the MIs 124.1-124.N may be collectively referred to as a multi-port memory unit. Moreover, in at least one embodiment, the memory unit 112, the MIs 124.1-124.N and MPs 120.1-120.N may support two memory accessing modes: a private memory access mode and a shared memory access mode, which may also be referred to as the private memory access method (or simply private memory access) and shared memory access method (or simply shared memory access). It should be noted that while MIs 124.1-124.N are shown as separate entities in FIG. 1, in some embodiments, they may be implemented as part of respective MPs 120.1-120.N, or in some other embodiments, as part of the memory unit 112.

With the exception of MP 120.1 and MP 120.N, all MPs may be coupled to two adjacent MPs such that each MP may be configured to receive addresses from a preceding MP and/or transmit addresses to a succeeding MP. The electronic coupling between MPs may provide a one-way flow of addresses (e.g., if one configuration specifies that addresses may flow from one MP to a next MP). For example, as shown in FIG. 1, MP 120.1 may be coupled to MP 120.2 for one-way flow of addresses, MP 120.2 may be coupled to MP 120.3 for one-way flow of addresses. The last MP 120.N may be an exception and coupled to the gasket memory 116, which may provide a temporary storage for addresses. The first MP 120.1 may be another exception in that it may receive one-way flow of addresses from the gasket memory 116. In some embodiments, the MPs 120.1-120.N may form an address routing bus along a PE row direction. That is, addresses may be routed between MPs in a direction that is parallel to the direction in which data may be routed between PEs and SBs. In at least one embodiment, the addresses transmitted between the MPs may be memory addresses updated by a MP. For example, a MP may perform some operation on the memory addresses (e.g., updating memory addresses) and pass the updated memory addresses to the next MP in the succeeding column.

The gasket memory 116 may be used as a data buffer, for example, first-in-first-out (FIFO), to collect addresses and data from the PE array (e.g., from MP 120.N, PE 118.N and/or SB 122.N) and feed them back to the PE array (e.g., to MP 120.1, and/or SB 122.1) when the first column of the PE array (e.g., MP 120.1, SB 122.1, and PE 118.1) is reconfigured by new configurations.

As illustrated in FIG. 1, each of the SB 122.1-122.N may be coupled to two adjacent SB (e.g., a preceding SB and a succeeding SB), with the exception of SB 122.1 and SB 122.N. SB 122.1 may be coupled to the MP 120.1, the gasket memory 116, PE 118.1 and the SB 122.2. And SB 122.N may be coupled to the MP 120.N, the gasket memory 116, PE 118.N and the SB 122.N−1. In some embodiments, the SBs 122.1-122.N may form data routing buses along a PE row direction. That is, data may be routed between SBs in a direction that is parallel to the direction in which data may be routed between PEs. In one embodiment, one or more SBs may be used to route data to bypass one or more PEs.

The SBs 122.1-122.N may be configured to provide data switching for data to be routed between neighboring PEs, from a PE to a MP, from a PE to the data routing buses, from a MP to a PE, from a MP to the data routing buses, from the data routing buses to a PE, and from the data routing buses to a MP. For example, the switch box 122.1 may be configured to provide data switching for data to be delivered to the processing element 118.1 from the gasket memory 116, the MP 120.1 or both. Moreover, the switch box 122.1 may be configured to route data from the gasket memory 116 to the MP 120.1. As another example, the switch box 122.2 may be configured to provide data switching for data to be delivered to the processing element 118.2 from the processing element 118.1, the MP 120.2, and/or the SB 122.1. Moreover, the switch box 122.2 may be configured to route data from the processing element 118.1 to the MP 120.2 or SB 122.3, from the SB 122.1 to the MP 120.2 or SB 122.3. In yet another example, the switch box 122.N may be configured to provide data switching for data to be delivered to the processing element 118.N from the PE 118.N−1, the MP 120.N, the SB 122.N−1 or any combination of the three sources. Moreover, the switch box 122.N may be configured to route data between PE 118.N−1, MP 120.N, SB 122.N−1 and the gasket memory 116. A SB may also be referred to as a data switching unit.

In some embodiments, output ports of vector processing units (e.g., each MP, each SB, and each PE) may be vector address or vector data ports. Address or data buffers at the output ports may be treated as vector registers. For example, a data buffer at one output port of the PE 118.1 coupled to the SB122.2 may be treated as a vector register for holding a vector of input values to the SB122.2. A data buffer at another output port of the PE 118.1 coupled to the SB122.2 may be treated as another vector register to hold another vector of input values to the SB 122.2. Also, data buffers at output ports of the SB 122.1 coupled to the SB 122.2 may be treated as vector registers for holding vectors of data values to be passed to the SB 122.2.

In one embodiment, data or address buffers at output ports of vector processing units may be mapped to vector registers labeled as VA, VB, IA, IB, IC, ID, IE, IF, IG, IH and DVA. VA and VB may be vector registers for output data buffers of a PE. IA, IB, IC, ID, IE, IF, IG, and IH may be vector registers for output data buffers of a SB at output ports coupled to input ports of the succeeding SB or the gasket memory. DVA may be a vector register for an output address buffer of a MP. Also, virtual vector registers MA and MB may be mapped to data connections from a MP to a SB so that the SB may route data read from the memory unit 112 to input ports of a PE. MA and MB may represent data obtained by the shared memory access and by the private memory access, respectively. The width of DVA may be $K \times G$ bits. The widths of other vector registers may be $K \times M$ bits. To support $2 \times M$-bit operations, 2 vector registers may be concatenated into a register pair and labeled as VAB, IAB, ICD, IEF, IGH, and MAB. For example, IAB may indicate a concatenated vector register pair (IB, IA) with IB being the higher M bits and IA being the lower M bits. Here (,) denotes component by component concatenation of M-bit data from 2 vector registers.

An exemplary data path may be illustrated by the exemplary internal connections of the SBs 122.1 to 122.N. For example, as shown in FIG. 1, SB 122.1 may show that two inputs of PE 118.1 may be coupled to two outputs from MP 120.1, SB 122.2 may show that two inputs of PE 118.2 may be coupled to two outputs from MP 120.2 and another two inputs of PE 118.2 may be coupled to two outputs from PE 118.1, SB 122.3 may show that two inputs of PE 118.3 may be coupled to two outputs from MP 120.3 and another two inputs of PE 118.3 may be coupled to two outputs from PE 118.2, and so forth, until SB 122.N may show that two inputs of PE 118.N may be coupled to two outputs from MP 120.N and another two inputs of PE 118.N may be coupled to two outputs from PE 118.N−1.

To simplify wording, a MP (or a MP 120) may refer to one of the MPs 120.1-120.N, a SB (or a SB 122) may refer to one of the SBs 122.1-122.N, and a PE (or a PE 118) may refer to one of the PEs 118.1-118.N.

A mixed-scalar-vector instruction set may be defined for the processor 100. The MPs 120.1-120.N, SBs 122.1-122.N, and PEs 118.1-118.N may be vector processing units of the processor 100 and the sequencer 106 may be a scalar processing unit of the processor 100. The instruction set may be designed such that one instruction may be executed by one programmable unit. For example, in one embodiment, each instruction may have 32 bits and certain bits of each instruction (e.g., the most significant 4 bits, the least significant four bits, or other bits) may identify the unit (e.g., the sequencer 106 or one component of the PE array 114) that executes the instruction.

Kernel programs may be made up of series of group of instructions. For example, a kernel according to various embodiments may be Compute Unified Device Architecture (CUDA) kernel, which may include a sequence of scalar and vector instructions. Scalar instructions may generate parameters used in vector instructions and manage loops and branches. Vector instructions may configure data paths in columns, control data flow and perform data crunching operations. One group of instructions may configure one column. An instruction for a PE including a no-operation (NOP) may be a delimiter of the group. In some embodiments, instructions in one group may be organized such that scalar instructions that generate parameters for vector instructions are placed before vector instructions. Columns do not directly decode vector instructions. Instead, the sequencer 106 may decode scalar and vector instructions, execute decoded scalar instructions and package decoded vector instructions in configurations and send configurations of memory ports (MPs 120.1-120.N), switch boxes (SBs 122.1-122.N), and processing elements (PEs 118.1-118.N) to columns.

In various embodiments, the processor 100 may be configured to perform Single Instruction Multiple Threads (SIMT) execution. A group of threads may form a block (e.g., a thread block) and a group of blocks may be organized into a grid. A kernel program may define a grid of blocks of threads for execution. Each block and thread may have a unique block and thread identifier (e.g., block ID and thread ID), respectively. The block ID for a block in a three-dimensional grid may be calculated as blockId=blockIdx.x+(blockIdx.y*gridDim.x)+(blockIdx.z*(gridDim.x*gridDim.y)). Variables blockIdx.x, blockIdx.y, and blockIdx.z may be the block ID in the x-axis, y-axis, and z-axis of the block, respectively. Variables gridDim.x and gridDim.y may be grid dimensions in the x-axis and y-axis, respectively. The "*" operator is the multiplication operator. The thread ID for a thread in a three-dimensional block may be calculated as threadId=blockId*(blockDim.x*blockDim.y*blockDim.z)+threadIdx.x+(threadIdx.y*blockDim.x)+(threadIdx.z*(blockDim.x*blockDim.y)). Variables threadIdx.x, threadIdx.y, and threadIdx.z may be the thread ID in the x-axis, y-axis, and z-axis of the thread, respectively. Variables blockDim.x, blockDim.y, and blockDim.z may be block dimensions in the x-axis, y-axis, and z-axis, respectively.

As used herein, the capital letters X, Y, and Z may refer to dimensions of a thread block in the x-axis, y-axis, and z-axis of the block, respectively. In one embodiment, the values for X, Y, and XYZ (e.g., the multiplication product of X times Y times Z) may be set by the system in the internal memory of the sequencer 106 before launching a kernel. And the sequencer 106 may load the dimensions from the internal memory, store the dimensions in a scalar register of the sequencer 106 and deliver them as immediate values in configurations to columns (e.g., MPs in a column).

The sequencer 106 may decode instructions sequentially, and dispatch configurations to target columns. In some embodiments, the sequencer 106 may decode one or more vector instructions to be executed by a MP, a SB and a PE together, generate a set of configurations for the MP, SB and PE of one column and dispatch the set of configurations to a target column in a batch. The configurations for vector processing units may include immediate values generated by executing scalar instructions at the sequencer 106. The vector instructions for generating a set of configurations and one or more scalar instructions preparing parameters for these vector instructions may be referred to as an instruction group. That is, an instruction group may contain scalar instructions and vector instructions that are mapped to one column. In some embodiments, the set of configurations for one column may also be referred to as a configuration for the column.

Sometimes, a kernel may be short and may need only half or less than half of the columns in the processor 100 for execution. In this situation, multiple instances of the same short kernel may be mapped to different segments of columns and fit in the processor 100 together. For example, a short kernel may need only 8 columns for execution and therefore 4 instances of the kernel can be mapped to the columns of the processor 100 (e.g., col. 1-8 for a first instance of kernel, col. 9-16 for a second instance of the kernel, col. 17-24 for a third instance of the kernel, and col. 25-32 for the fourth instance of the kernel). If the sequencer 106 sequentially initializes itself, fetches the kernel, decodes the kernel and dispatches configurations, this process may be repeated 4 times. In general, when a kernel is launched, there is an overhead for initializing the sequencer 106 and fetching the kernel. The impact of the overhead on the performance may be large when the kernel is short.

Further, because configurations dispatched to different segments of columns are generated from the same kernel, columns at the same position in different segments (e.g., col. 1, col. 9, col 17 and col. 25) may be configured by the same instruction group, and thus may access the same data in the memory. An instruction group may include scalar instructions and vector instructions. The scalar instructions of the instruction group may be executed by the sequencer 106 to generate immediate values for the vector instructions. The vector instructions of the same instruction group may be packaged into configurations for the PE, SB and MP of the same column.

In the example of 4 instances of one kernel mapped to the columns, columns at the same position of different segments (e.g., col. 1, 9, 17, and 25; or col. 2, 10, 18, and 26; etc.) may load data from the same memory locations. For example, a kernel may be programmed for processing image data using a machine learning model, which may include a matrix of parameters (e.g., filters in neural network models). Although each instance of the kernel may process a different portion of the image data, the weights of the matrix be the same and shared by different instances. If configuration dispatch of the kernel takes T cycles, a subsequent column (e.g., col. 9) may be configured T cycles after a preceding column (e.g., col. 1) for the same instruction group is configured. Due to latency, data loaded for the preceding column and kept in data cache of the memory unit 112 may be evicted from the cache by the time the subsequent column starts loading the same data from the memory. This may cause cache miss and degrade performance.

In some embodiments, the sequencer 106 may be configured to determine that a fetched kernel is a short kernel and map the short kernel to multiple segments of columns. For example, if the fetched kernel is a short kernel, the sequencer 106 may decode the instructions of one instruction group of the kernel, generate configurations for the same instruction group for multiple instances of the kernel and dispatch the configurations to different columns in different segments of columns together. Because the sequencer 106 is initialized only once and the kernel is loaded only once, overheads for any subsequent initialization of the sequencer 106 and load of the kernel after the first initialization and fetch may be eliminated. Moreover, because the configurations of the same instruction group may be dispatched together and different columns may execute the same instruction group close in time, cache miss rate may be improved.

In an embodiment in which the kernel is loaded only once and configurations for the same instruction group are generated and dispatched together, when all instances of the kernel are dispatched, all segments of columns may be configured by the same configurations as in the conventional approach of dispatching kernels, in which the kernel is fetched multiple times and configurations are generated and dispatched after each fetch of the kernel. The calculation results of kernels in the embodiment may be identical as the conventional way of fetching kernel multiple times and dispatch configurations multiple times, regardless of the order of configuration dispatch.

Figure 2:
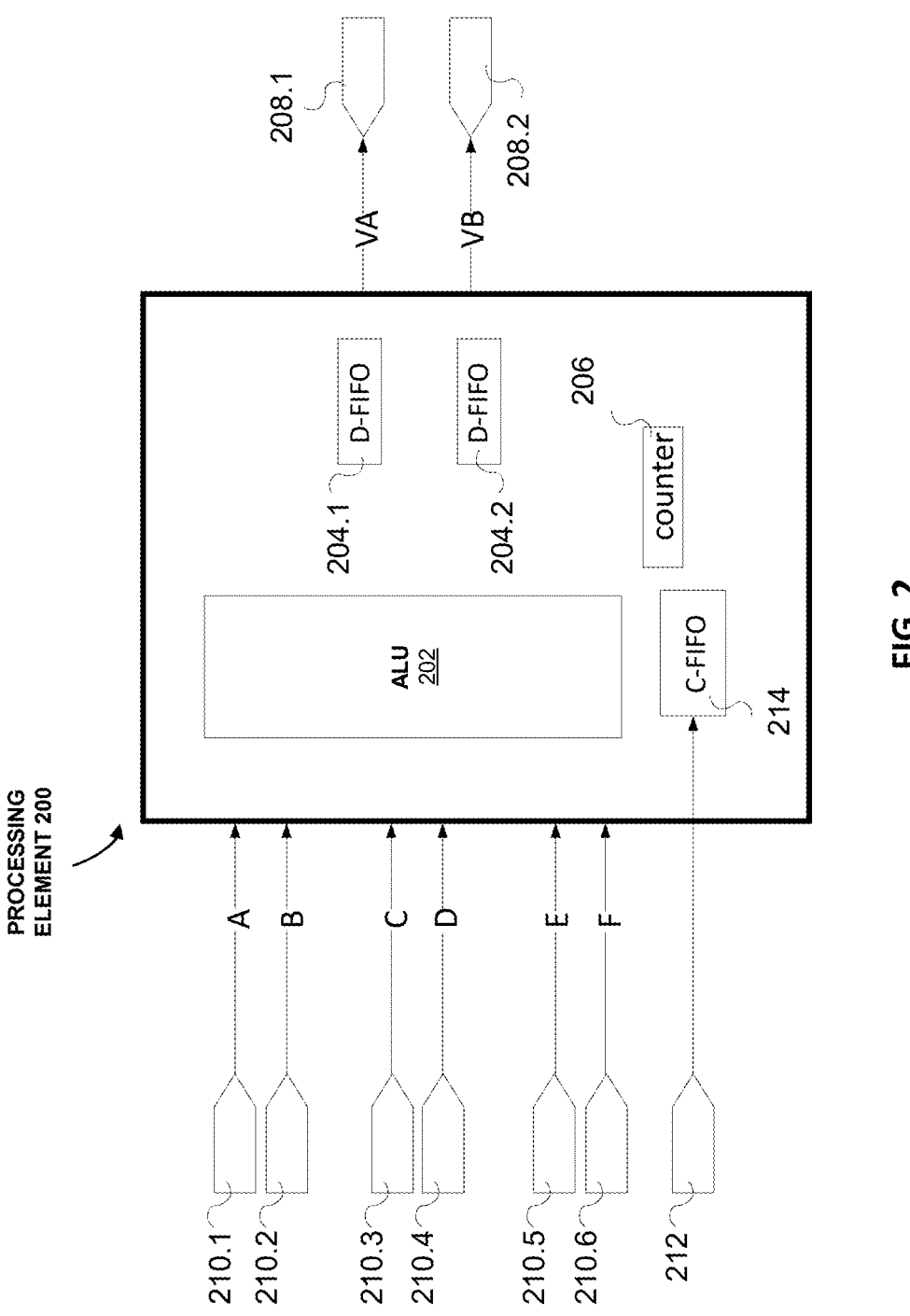
FIG. 2 schematically shows a processing element for a processor in accordance with an embodiment of the present disclosure.

FIG. 2 schematically shows a processing element (PE) 200 in accordance with an embodiment of the present disclosure. The PE 200 may be an embodiment of a PE 118. The PE 200 may comprise an Arithmetic Logic Unit (ALU) 202, a plurality of data buffers (e.g., D-FIFO 204.1, and 204.2), a counter 206, a plurality of data outputs (e.g., 208.1 and 208.2), a plurality of data inputs (e.g., 210.1 through 210.6), a configuration input 212 and a configuration buffer (e.g., C-FIFO 214). In one embodiment, the ALU 202 may be one ALU (e.g., one ALU that is configured to process one piece of data at a time and may be referred as a scalar ALU). In most embodiments, the ALU 202 may be a plurality of ALUs (or referred to as a vector ALU), for example, K ALUs, and Single Instruction Multiple Threads (SIMT) operation may be performed by the PE. As used herein, the capital letter K may be referred to as the vector size of ALU and an example K may be 32. It should be noted that the same vector size K may be applied in MPs, SBs, for example, for a vector register and a vector data bus. Please note that a scalar ALU may be a special case of a vector ALU with a vector size being one.

Data received from the data inputs 210.1 through 210.6 may be denoted as A, B, C, D, E, and F. Data sent to the data outputs 208.1 and 208.2 may be denoted as VA and VB. In an embodiment in which the ALU 202 may be one ALU, the widths of the data inputs 210.1 through 210.6 and the data outputs 208.1 and 208.2 may be M bits. The width of the ALU may be configured to be either M bits or 2×M bits by the configuration. If the width is M bits, the inputs of the ALU are A, B, and C. The output of the ALU is VA. If the width is 2×M bits, the inputs of the ALU are (B, A), (D, C) and (F, E). The output of the ALU is (VB, VA). Here (,) denotes concatenation of M-bit data. For example, when M is 8, inputs and outputs of ALU may be 8 bits; when M is 16, inputs and outputs of ALU may be 16 bits; when M is 32, inputs and outputs of ALU may be 32 bits; and so on. Input data pieces A, B, C, D, E, and F, and output data pieces VA and VB may be M bits. In an embodiment in which the ALU 202 may be a vector ALU, the data inputs 210.1 through 210.6 and the data outputs 208.1 and 208.2 may be vectors of K×M bits. And input data pieces A, B, C, D, E, and F, and output data pieces VA and VB may be vectors of K×M bits.

The data buffers 204.1 and 204.2 may be coupled to the data outputs 208.1 and 208.2 to temporarily store data pieces. The data buffers 204.1 and 204.2, which may be mapped to the vector registers VA and VB, respectively, may be used to decouple the timing of PEs from that of the succeeding SBs or the gasket memory. In one embodiment, the buffers may be implemented as FIFOs (e.g., a D-FIFO for a data buffer, a C-FIFO for a configuration buffer).

The configuration buffer C-FIFO 214 may receive configurations from the configuration input 212, which may be coupled externally to the sequencer 106 via the configuration bus, and store the received configurations before any execution of a data path starts. The configurations for the PE 200 may be referred to as PE configurations. The PE 200 may be statically configured while processing a thread block, e.g., the PE 200 may be programmed with instructions specified in the configuration to perform one stage of a pipeline. No instructions may be changed while data in the thread block are passing through the PE 200. One of the configuration parameters XYZ may be used to obtain the number of executions which may be specified by ceil (XYZ/K). Here function ceil (x) returns the least integer value greater than or equal to x. The counter 206 may be programmed with the number of executions and used to count the data passing through the data output 208.1. When the counter value has reached the number of executions, a new configuration may be applied. Therefore, reconfiguration capability may be provided in each PE. In one embodiment, the specified number of executions for an instruction may be referred to as NUM_EXEC, K threads concurrently executed may be referred to as a warp and this NUM_EXEC may be equal for all components in one data path. For example, for a thread block with the number of threads TH=1024 threads, NUM_EXEC=ceil (1024/32)=32. The counter 206 may be referred to as a warp counter.

Figure 3:
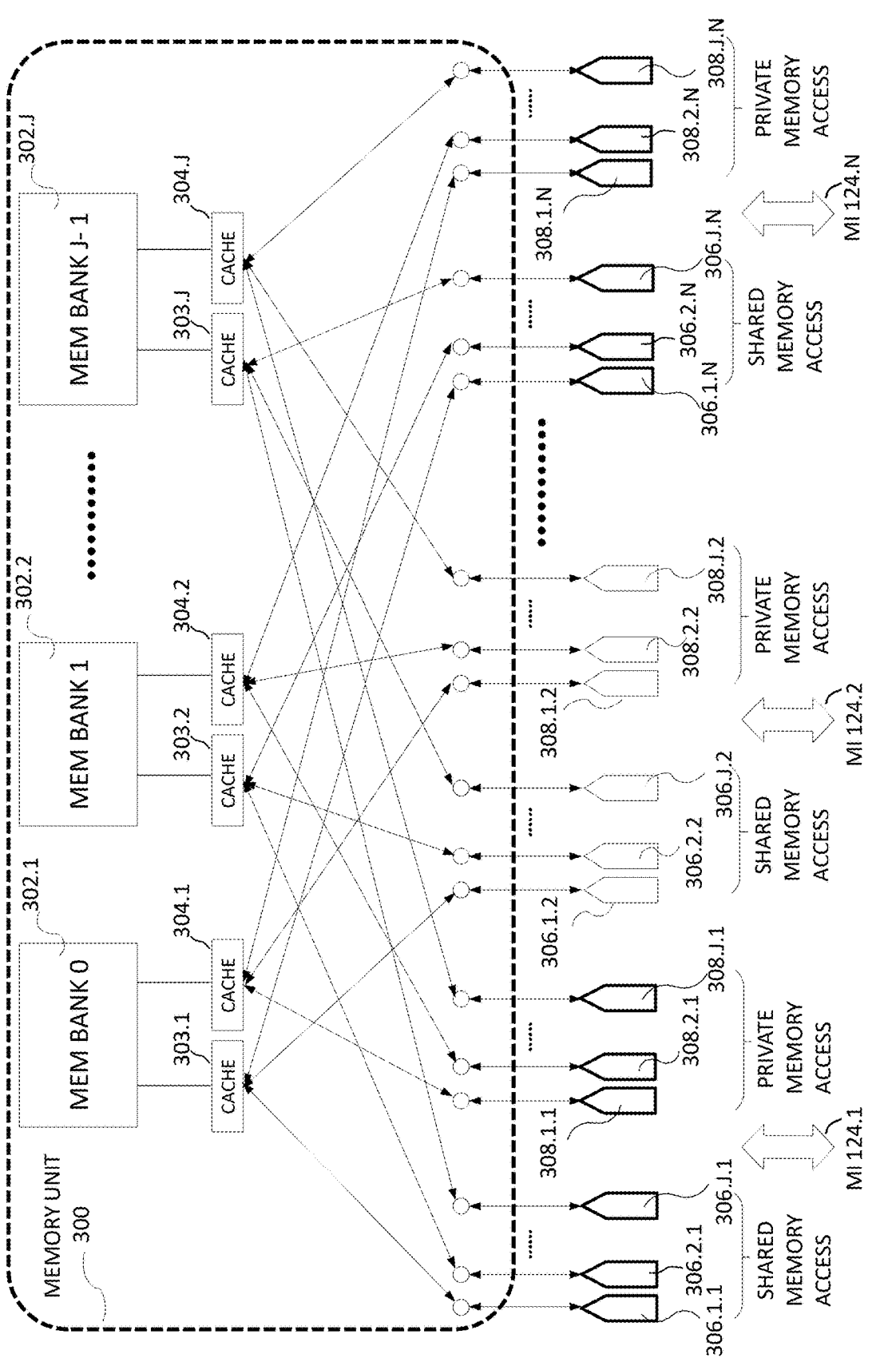
FIG. 3 schematically shows a memory unit for a processor in accordance with an embodiment of the present disclosure.

FIG. 3 schematically shows a memory unit 300 for the processor 100 in accordance with an embodiment of the present disclosure. The memory unit 300 may be an embodiment of the memory unit 112 and may serve as an on-chip cache for the PE array 114. The memory unit 300 may comprise a plurality of memory banks (e.g., memory bank 0 denoted as 302.1, memory bank 1 denoted as 302.2, memory bank J–1 denoted as 302.J, etc.), a plurality of memory caches 303.1 through 303.J for shared memory access and a plurality of memory caches 304.1 through 304.J for private memory access. The caches 303.1-303.J and 304.1-304.J may also be referred to as cache blocks. Each of the memory banks 302.1 through 302.J may be coupled to a respective cache 303 for shared memory access and a respective cache 304 for private memory access. For example, the memory bank 302.1 may be coupled to the cache 303.1 and cache 304.1, the memory bank 302.2 may be coupled to the cache 303.2 and cache 304.2, and so on until the memory bank 302.J may be coupled to the cache 303.J and 304.J. In one embodiment, the memory unit 300 may be a J-way interleaved memory where J may be a power of 2.

Each cache 303 may be individually coupled to all of the plurality of MIs 124.1-124.N for shared memory access via connection ports 306, and each cache 304 may be individually coupled to all of the plurality of MIs 124.1-124.N for private memory access via connection ports 308. Each of the connection ports 306 and 308 may use two subscriptions to identify its connection, with the first subscription identifying the memory cache (by the memory cache subscription 1 to J) and the second subscription identifying the MI (by the MI subscription 1 to N). For example, the connection port 306.1.1 may be for shared memory access for memory cache 303.1 and MI 124.1, the connection port 306.2.1 may be for shared memory access for memory cache 303.2 and MI 124.1, and so on until the connection port 306.J.1 may be for shared memory access for memory cache 303.J and MI 124.1; the connection port 306.1.2 may be for shared memory access for memory cache 303.1 and MI 124.2, the connection port 306.2.2 may be for shared memory access for memory cache 303.2 and MI 124.2, and so on until the connection port 306.J.2 may be for shared memory access for memory cache 303.J and MI 124.2; the connection port 306.1.N may be for shared memory access for memory cache 303.1 and MI 124.N, the connection port 306.2.N may be for shared memory access for memory cache 303.2 and MI 124.N, and so on until the connection port 306.J.N may be for shared memory access for memory cache 303.J and MI 124.N.

Similarly, the connection port 308.1.1 may be for private memory access for memory cache 304.1 and MI 124.1, the connection port 308.2.1 may be for private memory access for memory cache 304.2 and MI 124.1, and so on until connection port 308.J.1 may be for private memory access for memory cache 304.J and MI 124.1; the connection port 308.1.2 may be for private memory access for memory cache 304.1 and MI 124.2, the connection port 308.2.2 may be for private memory access for memory cache 304.2 and MI 124.2, and so on until the connection port 308.J.2 may be for private memory access for memory cache 304.J and MI 124.2; the connection port 308.1.N may be for private memory access for memory cache 304.1 and MI 124.N, the connection port 308.2.N may be for private memory access for memory cache 304.2 and MI 124.N, and so on until the connection port 308.J.N may be for private memory access for memory cache 304.J and MI 124.N.

It should be noted that both the number of caches 303 and the number of caches 304 may match the number of memory banks, denoted by capital letter J. And the number of MIs 124 may match the number of columns, denoted by capital letter N. The number of memory banks does not need to be identical to the vector size. For example, a vector (e.g., vector ALU, vector address, vector data ports) may have a vector size K, a PE array may have a number of columns N, and a memory unit may have a number of memory banks J. And K, N and J may be all different. In one embodiment, K may be divisible by J, J may be a power of 2, and the bit width of J minus 1 may be L (e.g., L is $\log_2(J)$). For example, J and L may be eight (8) and three (3), respectively, K may be 32 and N may also be 32.

Figure 4A:
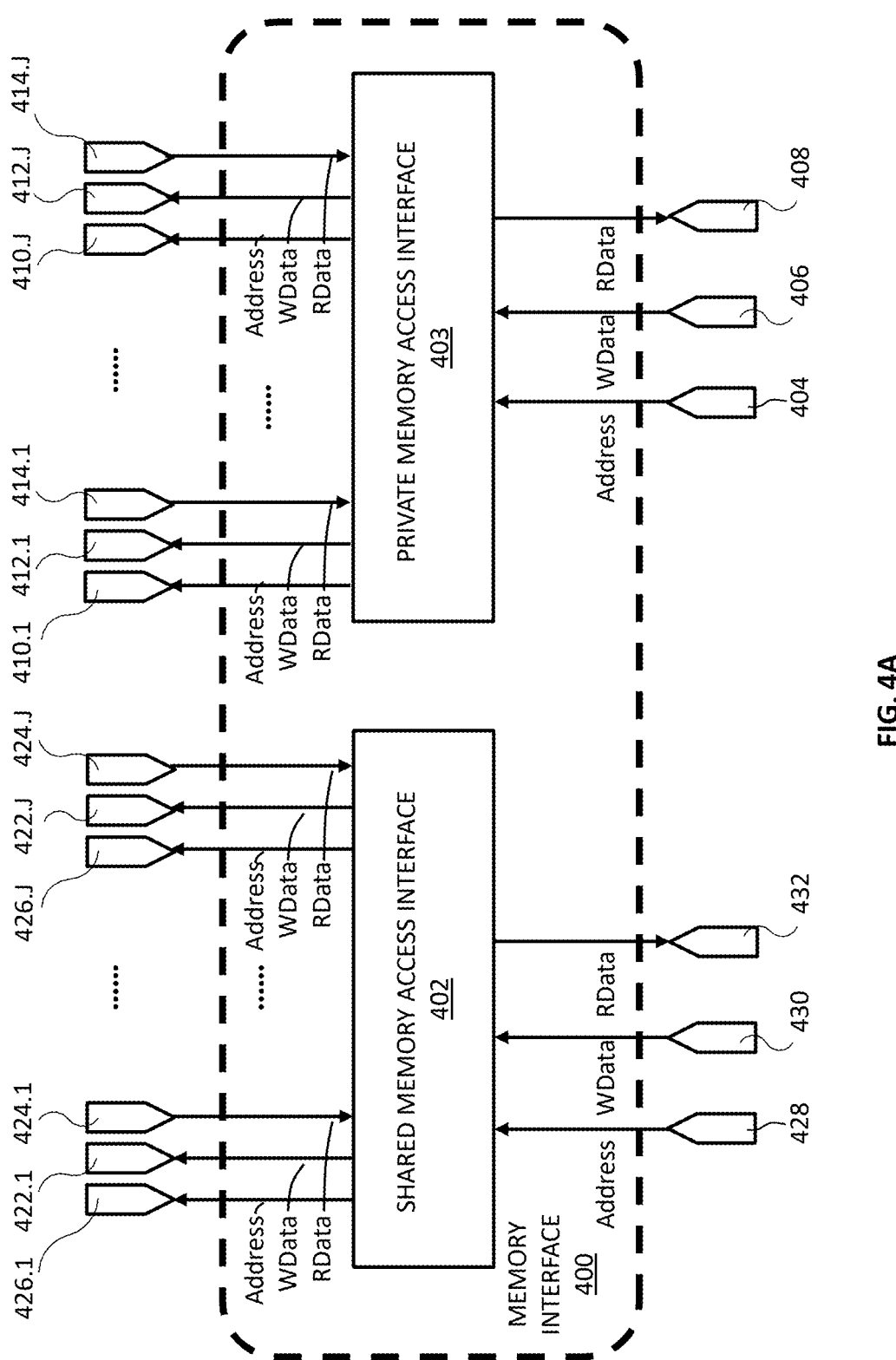
FIG. 4A schematically shows a memory interface in accordance with an embodiment of the present disclosure.

FIG. 4A schematically shows a memory interface (MI) 400 in accordance with an embodiment of the present disclosure. The MI 400 may be an embodiment of MI 124 of FIG. 1. In some embodiments, the memory interface may be referred to as a root box. The MI 400 may comprise a shared memory access interface 402 for shared memory access mode and a private memory access interface 403 for private memory access mode. The private memory access interface 403 may comprise an address port 404, a write data (WData) port 406 and a read data (RData) port 408 coupled to a memory port. The private memory access interface 403 may also comprise a plurality of address ports 410.1-410.J, a plurality of WData ports 412.1-412.J and a plurality of RData ports 414.1-414.J coupled to the memory unit 300. The shared memory access interface 402 may comprise an address port 428, a WData port 430 and a RData port 432 coupled to a memory port. The shared memory access interface 402 may also comprise a plurality of address ports 426.1-426.J, a plurality of WData ports 422.1-422.J and a plurality of RData ports 424.1-424.J coupled to the memory unit 300.

For connections to the memory unit 300, a set of address, WData and RData buses may be coupled to one connection port 306.1.1-306.J.N and 308.1.1-308.J.N shown in FIG. 3. For example, the address port 410.1, WData port 412.1 and RData port 414.1 of MI 124.1 may be coupled to the connection port 308.1.1 of the memory unit 300; the address port 410.J, WData port 412.J and RData port 414.J of MI 124.1 may be coupled to connection port 308.J.1. Meanwhile, the address port 410.1, WData port 412.1 and RData port 414.1 of MI 124.N may be coupled to the connection port 308.1.N of the memory unit 300; the address port 410.J, WData port 412.J and RData port 414.J of MI 124.N may be coupled to connection port 308.J.N Similarly, the address port 426.1, WData port 422.1 and RData port 424.1 of MI 124.1 may be coupled to the connection port 306.1.1 of the memory unit 300; the address port 426.J, WData port 422.J and RData port 424.J of MI 124.1 may be coupled to connection port 306.J.1. Meanwhile, the address port 426.1, WData port 422.1 and RData port 424.1 of MI 124.N may be coupled to the connection port 306.1.N of the memory unit 300; the address port 426.J, WData port 422.J and RData port 424.J of MI 124.N may be coupled to connection port 306.J.N.

In one embodiment, each of the WData ports and RData ports coupled to a memory port may be configured for vector data connections. For example, the WData port 406 may be a K×M-bit input port, and the RData port 408 may be a K×M-bit output port.

Address ports 404 and 428 may be configured to use vector addresses. In the private memory access mode, K addresses in one vector address may be continuous in ascending order in accordance with the thread ID. Thus, only the address for the thread with the least thread ID may need to be specified by the vector address, and the width of the address port 404 may be G bits, in one embodiment. Also, assuming J is less than or equal to K, the width of data ports of each bank (e.g., 412 and 414) may be (K/J)×M bits. Since the memory unit 300 may be a J-way interleaved memory, the least significant L bits of the address may determine the memory bank where data for the address may reside. Here L may be the bit width of J minus 1. All K data in one vector data may be evenly distributed among all memory banks and accessible without memory contention.

In the shared memory access mode, K addresses in one vector address may be different from each other. Data accessed by the vector address may be randomly spread in all memory banks which may result in memory contention. The width of the address port 428 may be K×G bits. The width of data ports of each bank (e.g., 422 and 424) may be M bits. The shared memory access interface 402 may resolve the memory contention.

Figure 4B:
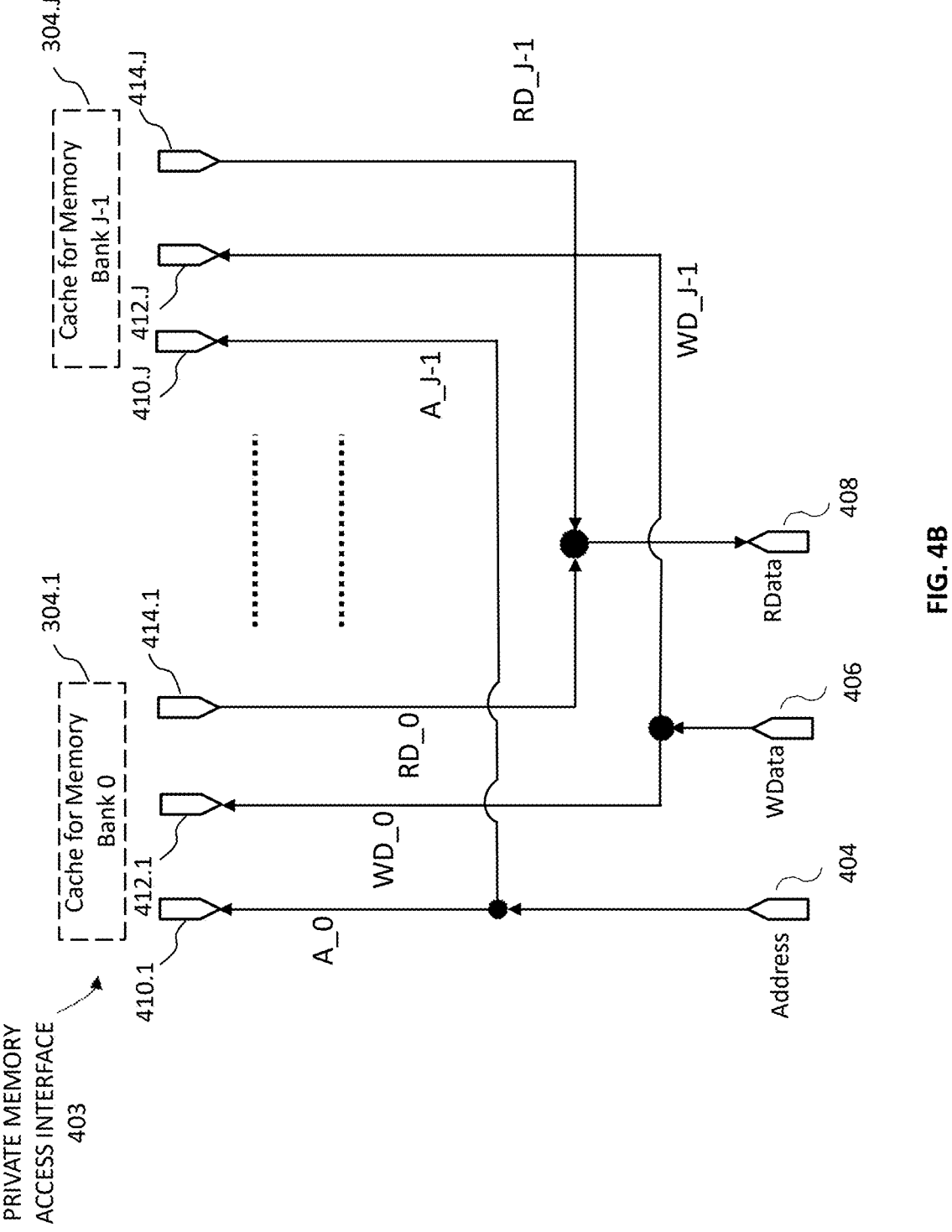
FIG. 4B schematically shows a private memory access interface in accordance with an embodiment of the present disclosure.

FIG. 4B schematically shows the private memory access interface 403 for private memory access in accordance with an embodiment of the present disclosure. The width of the memory address received at the address port 404 may be G bits. By adding 0, 1, 2, . . . , and J−1 to the address at address port 404, J addresses may be created. The least significant L bits of each of J addresses may be examined and the remaining G minus L bits (e.g., G-L bits) may be assigned to one of addresses A_0 through A_J−1 whose index matches the least significant L bits. The addresses A_0 through A_J−1 may be delivered to the memory banks via address ports 410.1 through 410.J. The widths of the vector data at the WData port 406 and at RData port 408 may be K×M bits. K data in the vector may be indexed from 0 to K−1. The least significant L bits of the address at address port 404 may be added to the K indices then the lower L bits of the results may be taken as indices of K data. At WData port 406, data with the same index are concatenated into data of (K/J)×M bits and assigned to one of write data WD_0 through WD_J−1 whose index matches that of concatenated data. The write data WD_0 through WD_J−1 may be delivered to the memory banks via WData ports 412.1 through 412.J. At RData port 408, (K/J)×M bits of read data RD_0 through RD_J−1 may be received from each memory bank via RData ports 414.1 through 414.J. Each read data of (K/J)×M bits may be split into K/J of M-bit data then organized into a K×M-bit vector using the indices in the reversed process of creating (K/J)×M-bit write data WD_0 through WD_J−1 from a K×M-bit vector.

Figure 4C:
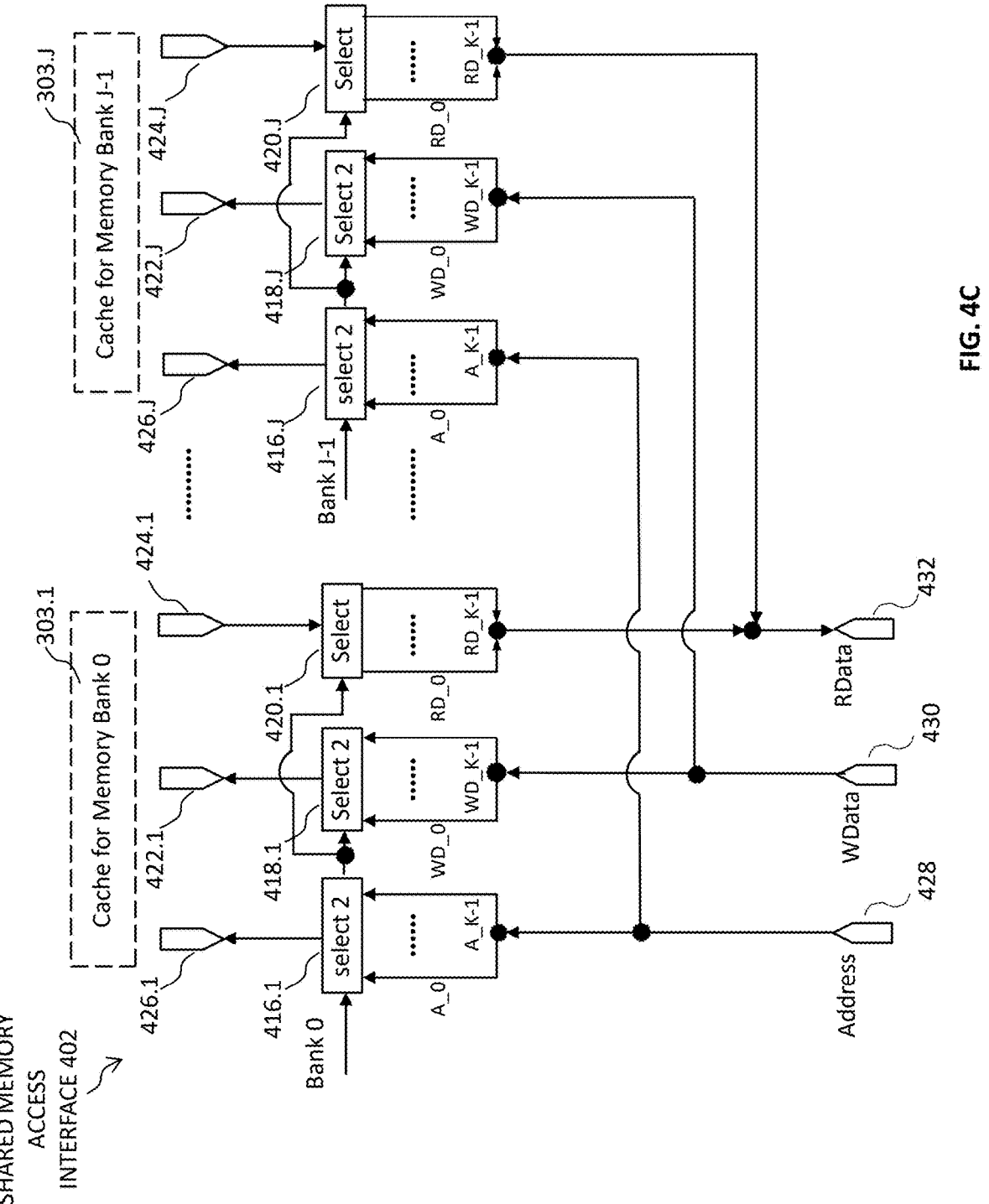
FIG. 4C schematically shows a shared memory access interface in accordance with an embodiment of the present disclosure.

FIG. 4C schematically shows the shared memory access interface 402 for shared memory access in accordance with an embodiment of the present disclosure. The address port 428 may be configured for a vector address of K×G bits, for example, K addresses of G bits as A_0, A_1 . . . , A_K−1. The number K may correspond to the vector size K of the vector ALU in a PE 118. The K addresses may be delivered to a plurality of address selection units (e.g., "Select 2" units 416.1 through 416.J). Each address selection unit 416.1 through 416.J may take the index of each memory bank as an input, for example, index 0 for "Bank 0", . . . , and index J−1 for "Bank J−1", scan the addresses from A_0 to A_K−1, pick up all addresses whose least significant L bits match the bank index, and send remaining G-L bits of the addresses one by one to the memory bank through the address port 426 (e.g., address port 426.1 for memory bank 0 cache 303.1, address port 426.J for memory bank J−1 cache 303.J, etc.). The width of the address port 426 may be G-L bits.

Because more than one address may be directed to the same memory bank, write data selection units (e.g., "Select 2" units 418.1 through 418.J) and read data selection units (e.g., "Select" units 420.1 through 420.J) may be provided to match the data being written to or read from the memory bank with the address sent to the memory bank. Each of the write data selection unit 418.1 through 418.J may receive the index of each address (e.g., 0 to K−1) sent to a corresponding address port 426.1 through 426.J from a corresponding address selection unit 416.1 through 416.J, and send one of the write data (e.g., WD_0 through WD_K−1) with the same index to WData port 422.1 through 422.J (e.g., WData port 422.1 for memory bank 0 cache 303.1, WData port 422.J for memory bank J−1 cache 303.J, etc.). For example, if the address selection unit 416.1 sends G-L bits of A_2, A_15, and A_28 to address port 426.1, the write data selection unit 418.1 receives indices 2, 15, and 28, and sends WD_2, WD_15, and WD_28 to WData port 422.1. Each of the read data selection unit 420.1 through 420.J may receive the index of each address (e.g., 0 to K−1) sent to a corresponding address port 426.1 through 426.J from a corresponding address selection unit 416.1 through 416.J, and assign the data received from RData port 424.1 through 424.J (e.g., RData port 424.1 for memory bank 0 cache 303.1, RData port 424.J for memory bank J−1 cache 303.J, etc.) to one of the read data (e.g., RD_0 through RD_K−1) with the same index. For example, if the address selection unit 416.1 sends G-L bits of A_2, A_15, and A_28 to address port 426.1, the read data selection unit 420.1 receives indices 2, 15, and 28, and assigns the data received from RData port 424.1 to RD_2, RD_15, and RD_28.

Figure 5:
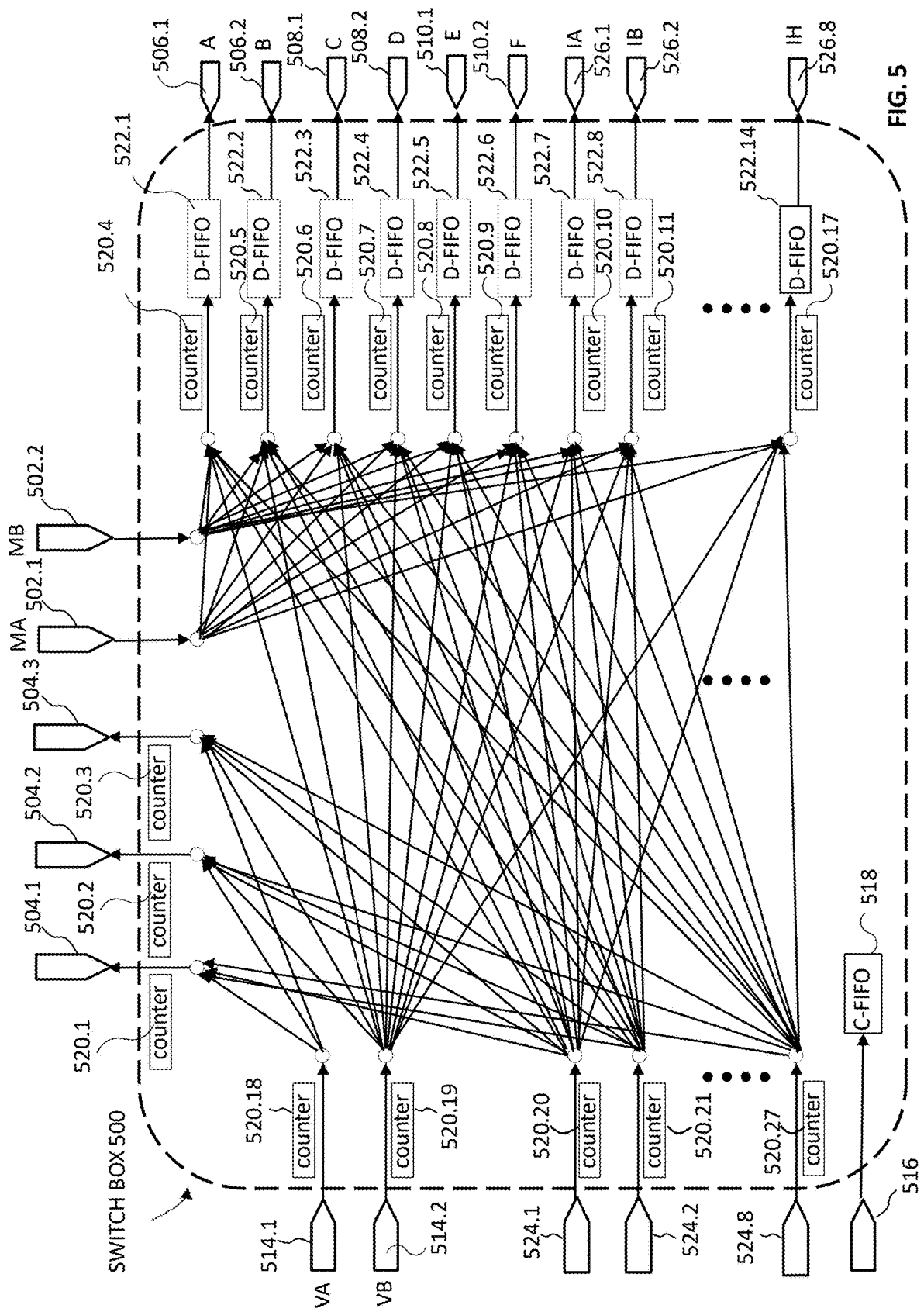
FIG. 5 schematically shows a switch box for a processor in accordance with an embodiment of the present disclosure.

FIG. 5 schematically shows a switch box (SB) 500 in accordance with an embodiment of the present disclosure. The SB 500 may be an embodiment of a SB 122 and may comprise a plurality of data inputs and data outputs, and inter-connections that couple the data inputs to data outputs for data switching. The data inputs of SB 500 may comprise data inputs 502.1, 502.2, 514.1, 514.2 and 524.1 through 524.8. The data outputs of SB 500 may comprise data outputs 504.1 through 504.3, 506.1, 506.2, 508.1, 508.2, 510.1, 510.2 and 526.1 through 526.8.

Externally, the data inputs 502.1 and 502.2 may be coupled to data outputs (e.g., read data ports) of a MP and mapped to the virtual vector registers MA and MB, respectively. One of them may be coupled to a private memory access data output and the other may be coupled to a shared memory access data output. The data output 504.1 may be coupled to a data input port of a MP. The data outputs 504.2 and 504.3 may be coupled to data inputs (e.g., write data ports) of a MP. One of them may be coupled to a private memory access write data port and the other may be coupled to a shared memory access write data port. The data inputs 514.1 and 514.2 may be coupled to data outputs 208.1 and 208.2 (e.g., labeled VA and VB) of a PE (or corresponding outputs of the gasket memory in case of SB 122.1), respectively. The data inputs 524.1 through 524.8 may be coupled to data outputs 526.1 through 526.8 of a SB of a preceding column (or corresponding outputs of the gasket memory in case of SB 122.1), respectively. The data outputs of 506.1, 506.2, 508.1, 508.2, 510.1, 510.2 may be coupled to data input ports 210.1 through 210.6 of a PE, respectively. Data from the data outputs 506.1, 506.2, 508.1, 508.2, 510.1 and 510.2 may be denoted as A, B, C, D, E, and F and data from the data inputs 514.1 and 514.2 may be denoted as VA and VB. A, B, C, D, E, and F may be input data to a PE 118 and VA and VB may be output data from a PE 118 as described herein.

The SB 500 may further comprise a configuration buffer 518 and a corresponding configuration input 516. The configuration buffer 518 may be implemented as a First-In-First-Out buffer and referred to as C-FIFO 518. The configuration input 516 may be coupled externally to the configuration bus that is coupled to the sequencer 106 for the SB 500 to receive configurations from the sequencer 106. The configurations for the SB 500 may be referred to as SB configurations. Moreover, the SB 500 may further comprise a plurality of counters 520.1-520.27. With the exception of the data inputs 502.1 and 502.2, each of other data inputs and all data outputs may have a corresponding counter 520. In addition, the SB 500 may also comprise a plurality of data buffers 522.1-522.14, which may be implemented as data First-In-First-Out buffers and referred to as D-FIFO 522.1-522.14. Each of the D-FIFO 522.1-522.14 may provide a respective output buffer for each of the data outputs 506.1, 506.2, 508.1, 508.2, 510.1, 510.2 and 526.1-526.8. D-FIFO 522.7-522.14 may be mapped to the vector registers IA IB, IC, ID, IE, IF, IG, and IH, respectively.

Inside the SB 500, the data input 502.1 may be coupled to the data outputs 506.1, 506.2, 508.1, 510.1 and 526.1 through 526.8. The data input 502.2 may be coupled to the data outputs 506.1, 506.2, 508.1, 508.2, 510.2 and 526.1 through 526.8. The data input 514.1 may be coupled to the data outputs 504.1-504.3, 506.1, 506.2, 508.1, 510.1, and 526.1 through 526.8. The data input 514.2 may be coupled to the data outputs 504.2, 504.3, 506.1, 506.2, 508.1, 508.2, 510.2 and 526.1 through 526.8. Each of the data inputs 524.1, 524.3, 524.5, and 524.7 may be coupled to the data outputs 504.1-504.3, 506.1, 506.2, 508.1, 510.1, and a corresponding one of outputs 526.1, 526.3, 526.5, and 526.7. Each of the data inputs 524.2, 524.4, 524.6, and 524.8 may be coupled to the data outputs 504.1-504.3, 506.1, 506.2, 508.1, 508.2, 510.2 and a corresponding one of outputs 526.2, 526.4, 526.6, and 526.8. For example, data input 524.1 may be coupled to 504.1-504.3, 506.1, 506.2, 508.1, 510.1, and 526.1, data input 524.2 may be coupled to 504.1-504.3, 506.1, 506.2, 508.1, 508.2, 510.2 and 526.2, etc. It should be noted that inside the SB 500, the coupling between an input and an output may be switched on (e.g., connected) or off (e.g., disconnected) based on a current configuration being applied at the SB 500. Moreover, D, E, and F ports of a PE may be for 2×M-bit configuration. Only higher M bits of register pairs (e.g., VB, IB, ID, IF, IH, and MB) may be assigned to D and F, and only lower M bits of register pairs (e.g., VA, IA, IC, IE, IG, and MA) may be assigned to E.

Each of the counters 520.1-520.27 at the data ports may be independently responsible for counting data passing through the data port. When one or more configurations may be loaded into the C-FIFO 518, each configuration may specify the number of executions (e.g., NUM_EXEC). These counters may be referred to as warp counters. During execution of one configuration, all counters 520.1-520.27 may independently count the numbers of data passing through the data ports. When all the warp counters reach the number of executions specified in the configuration, the next configuration in the C-FIFO 518 may be applied.

A similar approach of using the warp counters may be applied inside a PE 118, and a memory port 120. Because these counters may facilitate configuration and reconfiguration of each component that may have such counters, these counters may be referred to as reconfiguration counters and a component that has such counters may be referred to as a reconfigurable unit. An embodiment of a processor 100 may provide massive parallel data processing using the various reconfigurable units and may be referred to as a reconfigurable parallel processor (RPP).

Figure 6:
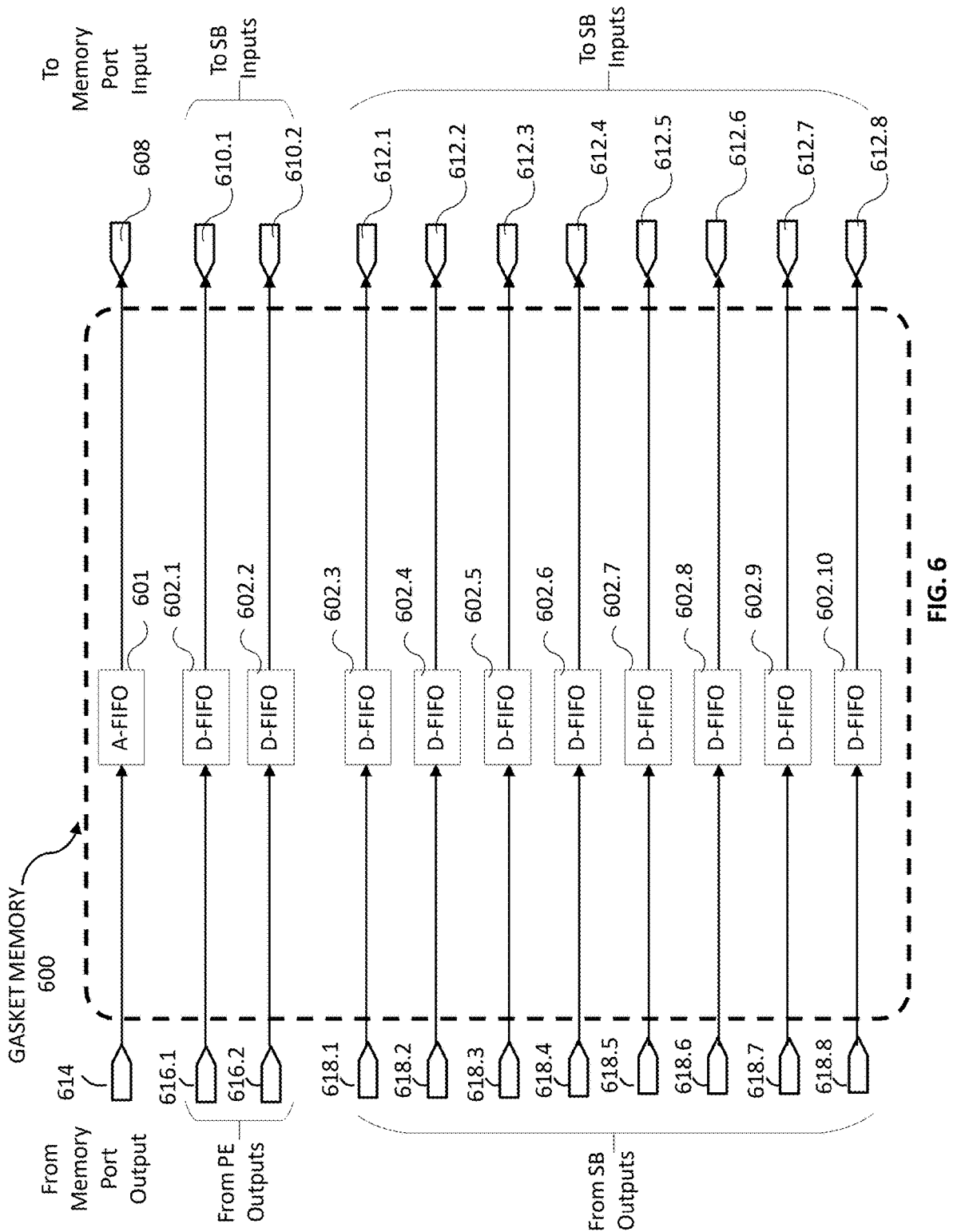
FIG. 6 schematically shows a gasket memory for a processor in accordance with an embodiment of the present disclosure.

FIG. 6 schematically shows a gasket memory 600 in accordance with an embodiment of the present disclosure. The gasket memory 600 may be an embodiment of the gasket memory 116 shown in FIG. 1. The gasket memory 600 may comprise a plurality of buffers for temporary storage of data and one buffer for address. The data buffers may be implemented as First-In-First-Out (FIFO) buffers and referred to as D-FIFOs (e.g., D-FIFO 602.1-602.10). The address buffer may be implemented as an address FIFO (e.g., A-FIFO 601). In addition, the gasket memory 600 may comprise a plurality of data inputs (e.g., 614, 616.1-616.2, and 618.1-618.8), and a plurality of data outputs (e.g., 608, 610.1-610.2, and 612.1-612.8).

The input 614 may be coupled to an output of MP 120.N and the output 608 may be coupled to an input of MP 120.1. Inside the gasket memory 600, the A-FIFO 601 may be coupled between the input 614 and output 608. The inputs 616.1 and 616.2 may be coupled to outputs 208.1 and 208.2 of PE 118.N, respectively. The outputs 610.1 and 610.2 may be coupled to inputs 514.1 and 514.2 of SB 122.1. Inside the gasket memory 600, the D-FIFO 602.1 may be coupled between the input 616.1 and output 610.1, and the D-FIFO 602.2 may be coupled between the input 616.2 and output 610.2. The inputs 618.1-618.8 may be coupled to outputs 526.1-526.8 of SB 122.N, respectively. The outputs 612.1-612.8 may be coupled to inputs 524.1-524.8 of SB 122.1, respectively. Inside the gasket memory 600, the D-FIFOs 602.3-602.10 may be coupled between the inputs 618.1-618.8 and outputs 612.1-612.8, respectively.

Figure 7:
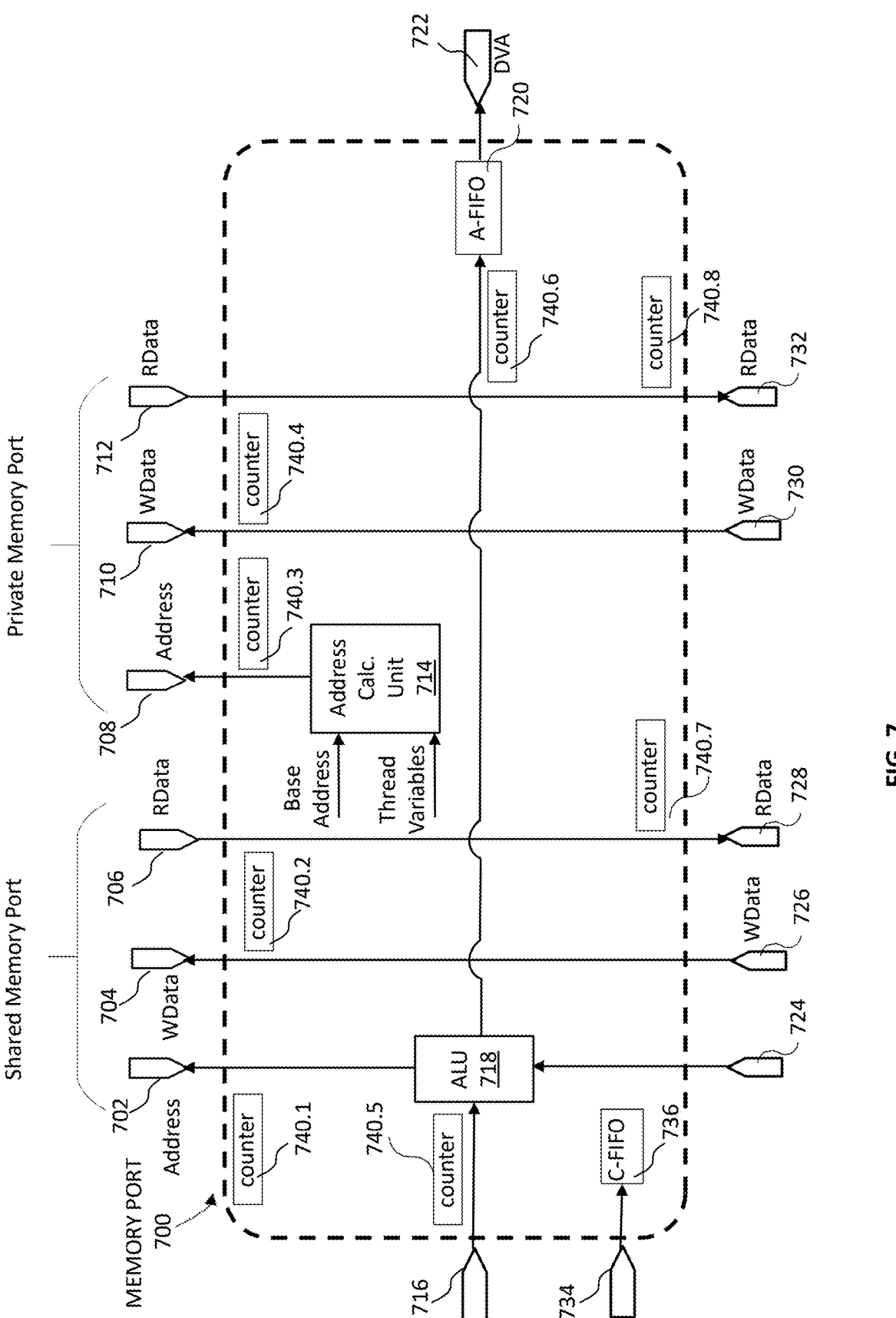
FIG. 7 schematically shows a memory port for a processor in accordance with an embodiment of the present disclosure.

FIG. 7 schematically shows a memory port (MP) 700 for a processor in accordance with an embodiment of the present disclosure. The MP 700 may be an embodiment of a MP 120. The memory port 700 may comprise an address port 702, a WData port 704 and a RData port 706 to be coupled to the address port 428, WData port 430 and RData port 432 of a shared memory access interface 402, respectively; an address port 708, a WData port 710 and a RData port 712 to be coupled to the address port 404, WData port 406 and RData port 408 of a private memory access interface 403, respectively; a data port 724, a WData port 726, a RData port 728, another WData port 730 and another RData port 732 to be coupled to the data ports 504.1, 504.2, 504.3, 502.1 and 502.2 of a SB 500, respectively.

The memory port 700 may further comprise a configuration input 734 and a configuration buffer (e.g., C-FIFO) 736. MP configurations may include instructions to be performed at a MP, for example, LOAD and STORE instructions to load data from the memory unit and to store data to the memory unit. The memory port 700 may further comprise an address input port 716, an ALU 718, an address buffer (e.g., A-FIFO) 720, and an address output port 722. The address input port 716 may be coupled to the address output port 722 of a MP of a preceding column (or the address output port 608 of the gasket memory 600 in case of MP 120.1), and the address output port 722 may be coupled to the address input port 716 of a MP of a succeeding column (or the address input port 614 of the gasket memory 600 in case of MP 120.N). The ALU 718 may perform operations on the addresses received from the address port 716 and the data received from the data port 724, and output the result addresses to the address port 702. Also, the ALU 718 may output the result addresses to the address port 722 or pass the addresses received from the address port 716 to the address port 722. The A-FIFO 720 may temporarily store the addresses from the ALU 718 before the addresses being output from the address port 722. The A-FIFO 720 may be mapped to the vector register DVA.

The memory port 700 may also comprise an address calculation unit 714. The address calculation unit 714 may be configured to generate memory addresses for private memory access using a base address and thread variables. The base address may be a starting memory address for data of a block (or a grid) of threads. The thread variables may include the block parameters, such as, but not limited to, the block (or grid) dimensions. The base address and thread variables may be delivered to the MP 700 in a MP configuration.

The memory port 700 may further comprise a plurality of counters 740.1-740.8 for counting the number of executions of one configuration (e.g., NUM_EXEC). Each of the counters 740 may be associated with a data port or address port. Each of the counters 740.1-740.8 may be independently responsible for counting data passed the associated ports. For example, the counter 740.1 may be associated with the address port 702, the counter 740.2 may be associated with the WData port 704, the counter 740.3 may be associated with the address port 708, the counter 740.4 may be associated with the WData port 710, the counter 740.5 may be associated with the address input port 716, the counter 740.6 may be associated with the address output port 722, the counter 740.7 may be associated with the RData port 728, and the counter 740.8 may be associated with the RData port 732. The counters 740.1-740.8 may be warp counters. During execution of one configuration, all counters 740.1-740.8 may independently count the numbers of data passing through the data ports. When all the warp counters reach the number of executions specified in the configuration, the next configuration in the C-FIFO 736 may be applied.

Figure 8:
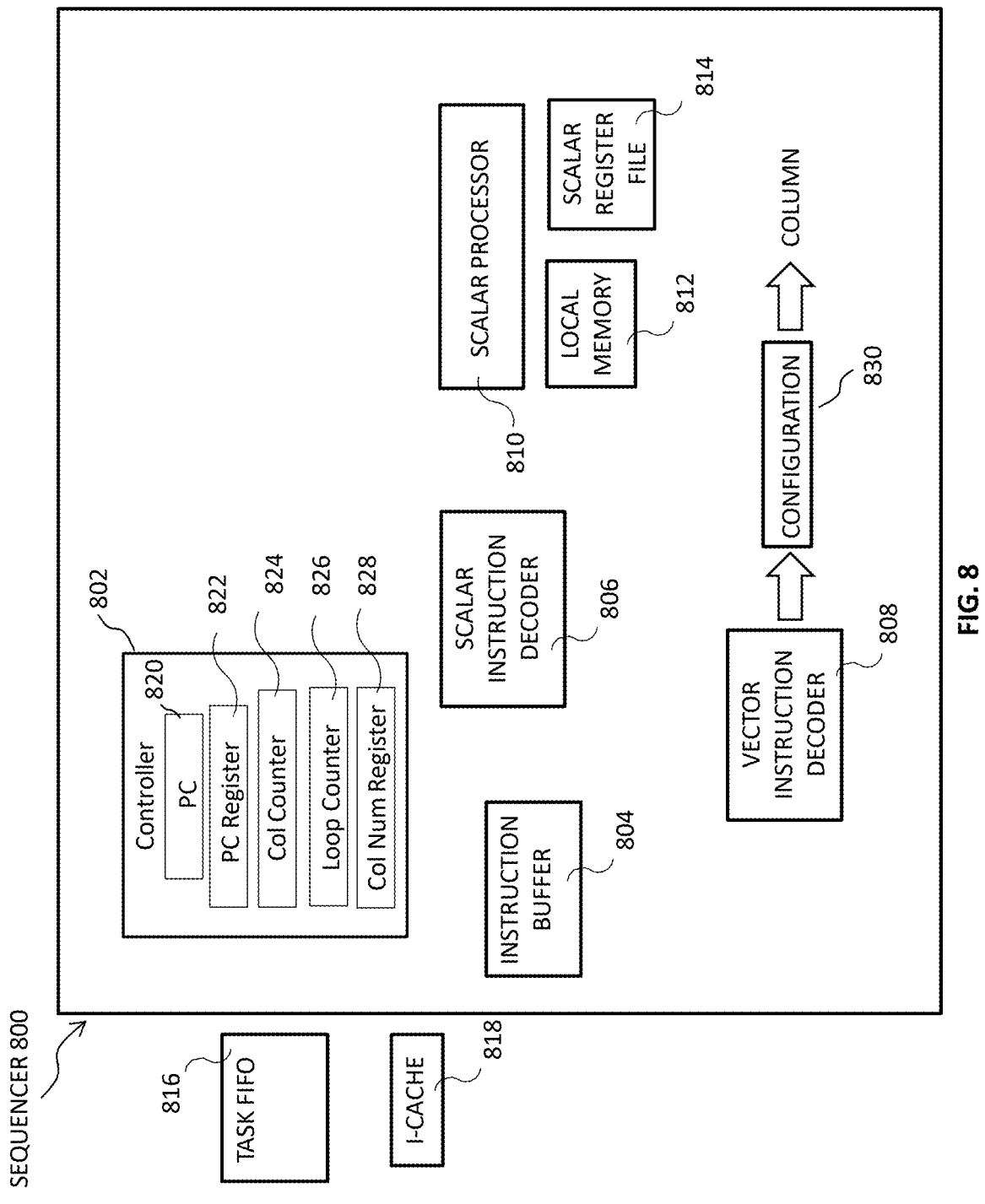
FIG. 8 schematically shows a sequencer for a processor in accordance with an embodiment of the present disclosure.

FIG. 8 schematically shows a sequencer 800 for a processor in accordance with an embodiment of the present disclosure. The sequencer 800 may be an embodiment of the sequencer 106 of FIG. 1, and may decode kernel programs, execute decoded scalar instructions, package decoded vector instructions into configurations and deliver the configurations to columns.

The sequencer 800 may be coupled to a task buffer (e.g., task FIFO) 816 and an instruction cache (e.g., i-Cache) 818. Information of a kernel such as base address of the program, job identifier (e.g., job ID), block identifier (e.g., block ID), and block indices may be transferred to the sequencer 800 via the task buffer 816. In one embodiment, the task buffer 816 and the instruction cache 818 may be part of the configuration memory 104 of FIG. 1. During operation, kernel information may be written to the task buffer 816 by external devices. When the task buffer 816 is not empty, the sequencer 800 may start processing a kernel after retrieving kernel information from the task buffer 816, then retrieve instructions from the instruction cache 818 for decoding and stop when an end-of-program instruction is decoded. The sequencer 800 may be idle when the task buffer 816 is empty.

In some embodiments, for short kernels that multiple instances of a kernel may fit in a processor 100, kernel information in the task buffer 816 may also include a number of instances of a kernel to fit in one processor, an address offset for the local memory and a register index offset for the scalar register to increment local memory addresses and indexes of scalar registers for each repetition, and amount of space between dispatches which may be equal to the number of columns that one instance of the kernel occupies.

In some embodiments, the kernel information may include a bit to indicate whether the sequencer 802 should work in a continuous mode. If the bit is set, the sequencer 800 may continuously read kernel information from the task buffer 816 and fetch kernel programs. Otherwise, the sequencer 800 may monitor status of columns (e.g., of PE array 114) and wait until all columns become inactive before reading the next kernel information from the task buffer 816.

The sequencer 800 may comprise a controller 802, an instruction buffer 804, a scalar instruction decoder 806, a vector instruction decoder 808, a scalar processor 810, a local memory 812, and a scalar register file 814. The controller 802 may fetch instructions from the instruction cache 818 and put the fetched instructions in the instruction buffer 804. In one embodiment, the instruction buffer 804 may be a circular buffer to hold a number of instructions (e.g., 64 or another number). During operation, for example, the controller 802 may fetch 64 instructions at the beginning of a kernel to fill the instruction buffer 804.

The fetched instructions may include scalar instructions and vector instructions mixed together. Certain bits of an instruction (e.g., the most significant 4 bits, the least significant four bits, or other bits) may specify a hardware unit designated to execute the instruction. The controller 802 may examine these bits and determine whether an instruction is a scalar instruction or a vector instruction based on the designated hardware unit.

The instruction buffer 804 may have an instruction pointer pointing to an instruction in the instruction buffer 804 as the next instruction to be processed. The next instruction to be processed may also be pointed to by a Program Counter (PC) 820 in the controller 802. The controller 802 may determine whether an instruction is a scalar instruction or a vector instruction, and direct scalar instructions to be sent to the scalar instruction decoder 806 and vector instructions to be sent to the vector instruction decoder 808. In some embodiments, the scalar instruction decoder 806 may decode one scalar instruction in one cycle and the vector instruction decoder 808 may decode a plurality of vector instructions in one cycle. For example, in one embodiment, the vector instruction decoder 808 may decode up to 8 vector instructions in one cycle. However, if a vector instruction refers one or more registers in the scalar register file 814 and the one or more registers are not ready yet, wait cycles may be inserted. PC 820 may be incremented by one when the scalar instruction decoder 806 decodes a scalar instruction. When the vector instruction decoder 808 decodes vector instructions, PC 820 may be incremented by the number of decoded vector instructions.

The sequencer 800 may sequentially process instructions in the order stored in the instruction cache 818. Scalar instructions decoded by the scalar instruction decoder 806 may be executed on the fly by controller 802 and the scalar processor 810. Some scalar instructions may generate parameters used to configure columns and manage loops and branches.

The vector instruction decoder 808 may decode vector instructions to generate configurations for vector processing units. Vector instructions may configure data paths in columns, control data flow and process data in parallel threads. For example, vector instructions for the memory ports (e.g., MPs 120) may include memory access instructions, such as but not limited to, LOAD and STORE; vector instructions for the switch boxes (e.g., SBs 122) may include data copy instructions, such as but not limited to, MOVE and FORWARD; and vector instructions for the processing elements (e.g., PEs 118) may include arithmetic and logical instructions, such as but not limited to, ADD and SUBTRACT, etc.

FIG. 8 shows a configuration 830 as an example of a configuration generated by the vector instruction decoder 808 and delivered to the columns. The configuration 830 may include a field for hardware configuration and a field for a set of immediate values. The field for hardware configuration may include one or more instructions to be performed at a vector processing unit. The set of immediate values may include parameters for the instructions In some embodiments, configurations may be broadcasted to all columns. One of the columns may be a destination or target column for one set of configurations, each column may have a separate single line coupled to the sequencer for transmitting a valid bit. The scalar instruction decoder 806 may assert the valid bit to select a target column when the configuration buffer of the target column is not full. That is, when the configuration buffer of the target column (e.g., configuration buffers of MP, PE, SB of the target column) has available space, the valid bit for the target column may be asserted for the configurations to be received by the target column. When valid signals are not asserted, inputs of configuration buffers of the vector processing units may be tied to the ground to prevent logics in the vector processing units from toggling.

The configuration buffer size for the vector processing units may be larger than one configuration unit size so that there is no need for the sequencer 800 and columns to be synchronized. That is, each of the vector processing units may hold more than one configuration at any time and each column of vector processing units may execute decoded vector instructions in an asynchronous manner with respect to the sequencer 800. Therefore, the sequencer 800 may complete configuration dispatch before columns complete program execution. In at least one embodiment, the sequencer 800 may monitor whether columns are active or inactive but does not monitor which instructions columns are executing.

Kernel specific parameters may be set in the local memory 812 by external devices before the kernel is initiated. The local memory 812 may be Random Access Memory (RAM) (e.g., DRAM, SRAM, etc.). While executing some scalar instructions, the scalar processor 810 may read these parameters from local memory 812, process the parameters, and store the parameters in scalar registers of the scalar register file 814. The scalar register file 814 may be shared by the scalar processor 810 and vector instruction decoder 808. The vector instruction decoder 808 may obtain the kernel specific parameters from the scalar register file 814 and deliver them to columns as immediate values in configurations. In addition, parameters (e.g., used to configure columns) generated by the scalar processor 810 executing scalar instructions may also be passed over to the vector instruction decoder 808 using the scalar register file 814. In some embodiments, the scalar register file 814 may comprise a plurality of scalar registers. For example, in one embodiment, the scalar register file 814 may comprise 32 16-bit scalar registers denoted as R0 to R31.

Scalar instructions in an instruction group may create parameters to be embedded in the configuration as immediate values from input parameters set by external devices in the local memory 812 and store created parameters to the scalar register file 814. For each instance of the kernel, the scalar instructions may be executed once, and thus for multiple instances of the kernel, the scalar instructions may be repeatedly executed multiple times. Some parameters for the scalar instructions may have the same values for different instances of the kernel. For example, a common value to be used by multiple instances of the kernel. For these parameters, executing the same scalar instruction may access the same memory location and/or the same scalar register. Some other parameters, however, may have different values for different instances of the kernel. To differentiate parameters for each execution, the memory location of the local memory 812 and registers in the scalar register file 814 accessed for each instance of the kernel may be different.

In one embodiment, for short kernels that multiple instances of one kernel may fit into N (e.g., 32) columns of the processor 100, to differentiate parameters for each instance of the kernel, the memory of the local memory 812 and registers in the scalar register file 814 may be partitioned into multiple segments of the same size. The sizes of segments of the local memory 812 and the scalar register file 814 are equal to the address offset and the register index offset, respectively.

For each instance of a short kernel, the scalar processor 810 may access a respective segment of local memory 812 by adding an associated address offset to the local memory address specified by the kernel. For example, if the address offset is 0x100 and the local memory address specified by the kernel is ADDR0 (e.g., address 0), the scalar processor 810 accesses the memory location at ADDR0 for the first instance, the memory location at "ADDR0+0x100" for the second instance, the memory location at "ADDR0+0x200" for the third instance, the memory location at "ADDR0+0x300" for the fourth instance, etc. With respect to the scalar register, for each instance of a short kernel, the scalar processor 810 may access a respective segment of scalar register file 814 by adding an associated register index offset to the indexes of scalar registers specified by the kernel. For example, if the register index offset is 8 and the scalar register specified by the kernel is R0, the scalar processor 810 accesses R0 for the first instance, R8 for the second instance, R16 for the third instance, R24 for the fourth instance, etc. The address offset and register index offset may be obtained from the task buffer 816.

The scalar processor 810 may comprise a scalar ALU and a Load/Store Unit. In one embodiment, the ALU may include an integer unit, a floating-point unit, a move unit, and a compare unit. Each of these units may be implemented in a multi-stage pipeline. The Load/Store Unit may also be implemented as multi-stage pipelines. The Load Unit may read data from the local memory 812 and store them to the scalar registers of the scalar register file 814. The Store Unit may write contents of the scalar registers of the scalar register file 814 to the local memory 812.

The scalar instructions decoded by the scalar instruction decoder 806 may include control flow instructions that may be executed by the controller 802. In some embodiments, the control flow instructions may include, but not limited to, repeat, jump, poll, and barrier instructions. A jump instruction is to change the execution flow from the next instruction in a current sequence of instructions to a destination instruction pointed by the jump instruction. A poll instruction is to let the controller 802 stop fetching instructions and wait until the DMA operation is done (e.g., DMA module 102 finishes). The poll instruction may synchronize the sequencer 800 and columns. When a barrier instruction is executed, the controller 802 may stop fetching instructions and wait until all columns become inactive. The barrier instruction may synchronize the sequencer 800 and columns.

In some embodiments, the controller 802 may comprise separate hardware units each configured to execute a different type of instruction assigned to the controller 802. For example, the controller 802 may comprise a hardware unit for executing the jump instructions, another hardware unit for executing the poll instructions and yet another hardware unit for executing the barrier instructions.

For repeat instructions, the controller 802 may be equipped with a PC register 822, a column counter 824, a loop counter 826, and a column number register 828. In one embodiment, these hardware units may be contained in one hardware unit designated for repeat instructions. When a repeat instruction is executed, the controller 802 may capture the current value of the PC 820 in the PC register 822, clear the column counter 824, set the loop counter 826 to the total number of times the instruction to be repeatedly executed, and set the column number register 828 to a number of columns to be repeated. The latter 2 values may be provided by the repeat instruction. The controller 802 may increment the column counter 824 when configurations are sent to a column. If the column counter value in the column counter 824 is equal to the column number register value in the column number register 828, the controller 802 may clear the column counter 824 and decrement the loop counter 826. If the loop counter value in the loop counter 826 is not zero, the controller 802 may replace the value in the PC 820 with the PC register value in the PC register 822 to jump back to the start point of the loop. If the loop counter value is zero, the controller 802 may exit the loop.

Figure 9:
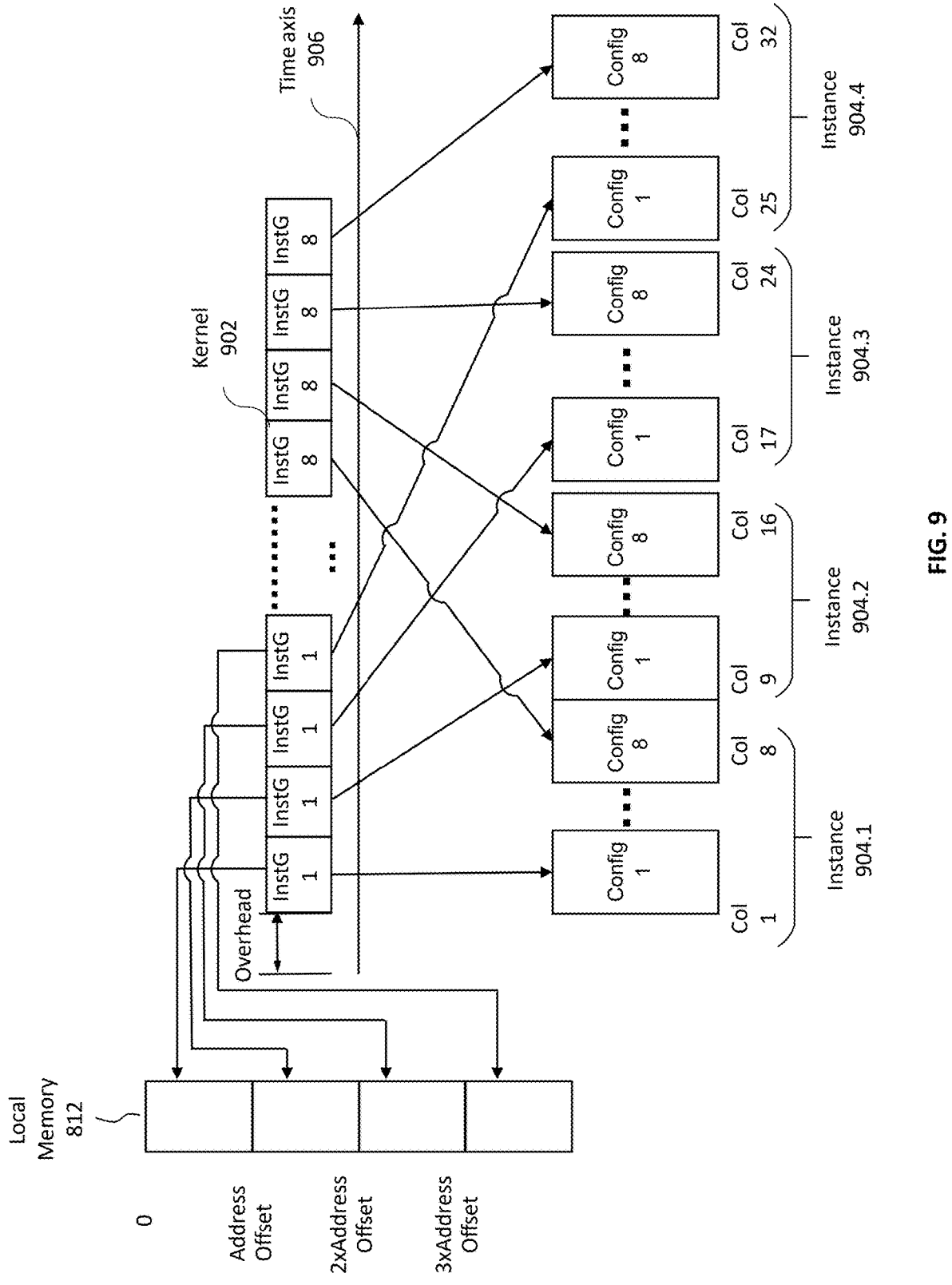
FIG. 9 schematically shows multiple instances of a short kernel mapped to multiple segments of columns of a processor in accordance with an embodiment of the present disclosure.

FIG. 9 schematically shows multiple instances of a kernel 902 mapped to multiple segments of columns of a processor in accordance with an embodiment of the present disclosure. The kernel 902 may comprise 8 instruction groups (e.g., InsG 1 through InsG 8) and 4 instances of the kernel 902 (e.g., Instance 904.1 through Instance 904.4) may fit in the 32 columns of an embodiment of the processor 100.

Each instruction group may be repeatedly and successively processed by the sequencer 800. For example, one or more scalar instructions of an instruction group may be decoded and repeatedly executed to generate immediate values for the vector instructions, and the vector instructions of the instruction group may also be repeatedly decoded to generate configurations. The time axis 906 may show the timing of processing of the kernel 902 by the sequencer 800. As shown in FIG. 9, the sequencer 800 may initialize itself and fetch the kernel once and therefore there is one overhead period at the beginning of the kernel. Then each instruction group may be repeatedly processed according to the number of instances to fit in the processor. In the example of FIG. 9, the number of instances is 4, so that processing of the instruction group may be repeated three times after the first processing. That is, each instruction group may be processed four times as shown in FIG. 9.

For scalar instructions, the scalar processor 810 may perform the first execution with the addresses specified by the kernel (e.g., address A in the local memory 812) and repeat the execution by adding corresponding address offsets to the addresses specified by the kernel (e.g., if the address offset is O, A+O, A+2O and A+3O). Although not shown, the scalar processor 810 may store generated values to the registers with the first execution writing to scalar registers specified by the kernel (e.g., R0 in the scalar register file 814) and repeat the execution by adding corresponding register index offsets to the indexes of scalar registers specified by the kernel (e.g., if the register index offset is 8, R8, R16, and R24).

For vector instructions, the vector instruction decoder 808 may successively repeat decoding the vector instructions of each instruction group using contents of scalar registers with corresponding indexes as immediate values of a configuration. After decoding vector instructions of each instruction group, the sequencer 800 may dispatch a configuration to a column with a space of 8 columns in between, which may be equal to the number of columns a kernel occupies.

FIG. 10 is a flowchart of a process 1000 for dispatching multiple instances of a short kernel in accordance with an embodiment of the present disclosure. At block 1002, kernel information of a kernel may be retrieved by a sequencer. The kernel information may include a number of instances of the kernel to be mapped in one processor, an address offset and a register index offset, a number of columns of vector processing units that the kernel occupies. For example, kernel information may be written to the task buffer 816 and retrieved by the sequencer 800. At block 1004, instructions of the kernel may be retrieved from an instruction cache by the sequencer. For example, the sequencer 800 may retrieve instructions of a kernel from the instruction cache 818.

At block 1006, decoded scalar instructions of each instruction group may be repeatedly and successively executed according to the number of instances of the kernel to fit in one processor. A first execution of the decoded scalar instructions may use local memory addresses and scalar registers specified by the kernel and each repetition of execution may use the local addresses incremented by the address offset multiplied by a respective repetition count, and scalar registers with indexes incremented by the register index offset multiplied by the respective repetition count. For example, FIG. 9 shows the local memory 816 may be partitioned into four segments, with the first segment for the first instance of the kernel 902 containing memory addresses that the kernel specifies, and subsequent segments for subsequent instances of the kernel 902 each containing incremented memory addresses by the address offset multiplied by respective repetition count (e.g., the first repetition with the memory addresses incremented by one address offset, the second repetition with the memory addresses incremented by two address offsets, the third repetition with the memory addresses incremented by three address offsets).

At block 1008, vector instructions of each instruction group may be repeatedly and successively decoded according to the number of instances of the kernel. A first vector instruction decoding may use scalar registers that the kernel specifies and each repetition of decoding may use the scalar registers with indexes incremented by the register index offset multiplied by the respective repetition count. For example, assuming there are 32 scalar registers R1 through R32 in the scalar register file 814 and each instance of the kernel 902 may use 8 scalar registers R0 through R7, the register index offset may be eight (8). The second instance of the kernel 902 may use scalar registers R8 through R15. The third instance of the kernel 902 may use scalar registers R16 through R23. The fourth instance of the kernel 902 may use scalar registers 24 through R31.

At block 1010, a respective configuration may be dispatched to a respective column after the first vector instruction decoding and each repetition of decoding. Each respective configuration may be generated after decoding the vector instructions of the instruction group a respective time. An amount of space between two subsequent dispatches may be equal to the number of columns that the kernel occupies. For example, as shown in FIG. 9, configuration 1 may be generated for instruction group 1 four times and dispatched to col. 1, col. 9, col. 15 and col. 25, respectively; and configuration 8 may be generated for instruction group 8 four times and dispatched to col. 8, col. 16, col. 24 and col. 32, respectively.

The present disclosure provides apparatus, systems and methods for reconfigurable parallel processor (RPP). Embodiments of a RPP may be optimized to allow massive parallelism for Single Instruction Multiple Threads (SIMT) processing. In one example, with one row of 32 PEs and each PE having 32 Arithmetic Logic Units (ALUs), 1024 ALUs may be included in one RPP core. In some embodiments, a multi-core processor may comprise multiple RPPs.

Embodiments of a RPP may be reconfigured according to a reconfiguration mechanism. The various components of a RPP that include one or more reconfiguration counters may be referred to as reconfigurable units. For example, each of the PEs (e.g., PE 118), the switch boxes (e.g., SB 122) and the memory ports (e.g., MP 120), may comprise one or more reconfiguration counters, such as the counter 206 in a PE, the counters 520 in a SB, the counters 740 in a MP. Data processing may be pipelined when there may be no dependency between threads. Identical instructions may be executed multiple times until all threads (e.g., 32 warps of threads for one reconfigurable unit if the total number of threads is 1024) are processed. In various embodiments, when counters in a reconfigurable unit reach a programmed number (e.g., NUM_EXEC), the reconfigurable unit may replace its configuration to a new context. This reconfiguration may be done in the same way in each PE, SB and MP. Self-reconfiguration may be achieved with minimum idle time for switching.

In an exemplary embodiment, a processor may comprise a sequencer and a plurality of columns of vector processing units coupled to the sequencer. The sequencer may include: a scalar instruction decoder, a scalar processor, a vector instruction decoder, a local memory, and a scalar register file. The sequencer may be configured to retrieve kernel information of a kernel and retrieve instructions of the kernel from an instruction cache by the sequencer. The kernel information may include a number of instances of the kernel to fit in the processor, an address offset and a register index offset, a number of columns of vector processing units that the kernel occupies. The instructions of the kernel may include a plurality of instruction groups. The sequencer may be further configured to repeatedly execute scalar instructions of each instruction group of the kernel decoded by the scalar instruction decoder successively by the scalar processor according to the number of instances of the kernel, repeatedly decode vector instructions of each instruction group of the kernel successively by the vector instruction decoder according to the number of instances of the kernel, and dispatch a respective configuration to a respective column after the first vector instruction decoding and each repetition of decoding. A first execution of the decoded scalar instructions may use addresses in the local memory and scalar registers in the scalar register file specified by the kernel and each repetition of execution may use incremented addresses in the local memory with an increment amount being equal to the address offset multiplied by a respective repetition count and scalar registers with indexes incremented by the register index offset multiplied by the respective repetition count. A first vector instruction decoding may use the scalar registers specified by the kernel and each repetition of decoding may use the scalar registers with indexes incremented by the register index offset multiplied by the respective repetition count. Each respective configuration may be generated after decoding the vector instructions of the instruction group a respective time and dispatched to a respective column with an amount of space between two subsequent dispatches equal to the number of columns that the kernel occupies.

In one embodiment, each column of vector processing units may comprise a memory port configured to perform vector memory access operations, a switch box and a processing element configured to perform Single Instruction Multiple Threads (SIMT) data processing operations.

In one embodiment, the sequencer may further comprise adders to increment local memory addresses and scalar register indexes by the address offset multiplied by the repetition count and the register index offset multiplied by repetition count, respectively, for each repetition of executing scalar instructions and decoding vector instructions.

In one embodiment, each column of vector processing units may comprise a processing element with a vector Arithmetic Logic Unit (ALU) configured to perform Single Instruction Multiple Threads (SIMT) data processing operations.

In one embodiment, the sequencer may further comprise a controller configured to execute scalar control flow instructions including repeat, jump, poll, and barrier.

In one embodiment, the controller may include respective hardware execution units for each type of the scalar control flow instructions.

In one embodiment, the controller may further include a Program Counter (PC) register, a column counter, a loop counter, and a column number register for executing a repeat instruction.

In one embodiment, each vector processing unit of plurality of columns of vector processing units may comprise a configuration buffer sized to hold more than one configuration.

In one embodiment, each column of vector processing units may be configured to execute decoded vector instructions in an asynchronous manner with respect to the sequencer.

In one embodiment, the kernel may be a sequence of scalar and vector instructions with each instruction grouping including one or more scalar instructions and one or more vector instructions.

In another exemplary embodiment, a method may comprise retrieving kernel information of a kernel by a sequencer, retrieving instructions of the kernel from an instruction cache by the sequencer. The kernel information may include a number of instances of the kernel to fit in a processor, an address offset and a register index offset, a number of columns of vector processing units that the kernel occupies. The instructions of the kernel may include a plurality of instruction groups. The method may further comprise repeatedly executing decoded scalar instructions of each instruction group of the kernel successively according to the number of instances of the kernel, repeatedly decoding vector instructions of each instruction group of the kernel successively according to the number of instances of the kernel, and dispatching a respective configuration to a respective column after a first vector instruction decoding and each repetition of decoding. A first execution of the decoded scalar instructions may use local memory addresses and scalar registers specified by the kernel and each repetition of execution may use incremented addresses in the local memory with an increment amount being equal to the address offset multiplied by a respective repetition count and scalar registers with indexes incremented by the register index offset multiplied by the respective repetition count. The first vector instruction decoding may use the scalar registers specified by the kernel and each repetition of decoding may use the scalar registers with indexes incremented by the register index offset multiplied by the respective repetition count. Each respective configuration may be generated after decoding the vector instructions of the instruction group a respective time and dispatched to a respective column with an amount of space between two subsequent dispatches equal to the number of columns that the kernel occupies.

In one embodiment, each column of vector processing units may comprise a memory port configured to perform vector memory access operations, a switch box and a processing element configured to perform Single Instruction Multiple Threads (SIMT) data processing operations.

In one embodiment, incrementing local memory addresses and scalar register indexes may be performed by adders adding the address offset multiplied by the respective repetition count and the register index offset multiplied by the respective repetition count, respectively, for each repetition of executing scalar instructions and decoding vector instructions.

In one embodiment, each column of vector processing units may comprise a processing element with a vector Arithmetic Logic Unit (ALU) configured to perform Single Instruction Multiple Threads (SIMT) data processing operations.

In one embodiment, the method may further comprise asserting a valid bit for a selected column of the plurality of columns of vector processing units for a configuration directed to the selected column to be received by the selected column.

In one embodiment, the method may further comprise writing data, by a scalar processor executing a decoded scalar instruction, to a scalar register file shared by the scalar processor and a vector instruction decoder to pass the data to the vector instruction decoder.

In one embodiment, the method may further comprise executing a scalar control flow instruction to change execution flow of the sequencer.

In one embodiment, the scalar control flow instruction may be one of a group of scalar instruction flow instructions including repeat, jump, poll, and barrier.

In one embodiment, each column of vector processing units may execute decoded vector instructions in an asynchronous manner with respect to the sequencer.

In one embodiment, the kernel may be a sequence of scalar and vector instructions with each instruction grouping including one or more scalar instructions and one or more vector instructions.

The techniques described herein may be implemented in one or more application specific integrated circuits (ASICs) in digital logic gates, or by a processor that executes instructions stored in a tangible processor readable memory storage media.

In one embodiment, any of the disclosed methods and operations may be implemented in software comprising computer-executable instructions stored on one or more computer-readable storage media. The one or more computer-readable storage media may include non-transitory computer-readable media (such as removable or non-removable magnetic disks, magnetic tapes or cassettes, solid state drives (SSDs), hybrid hard drives, CD-ROMs, CD-RWs, DVDs, or any other tangible storage medium), volatile memory components (such as DRAM or SRAM), or non-volatile memory components (such as hard drives)). The computer-executable instructions may be executed on a processor (e.g., a microcontroller, a microprocessor, a digital signal processor, etc.). Moreover, an embodiment of the present disclosure may be used as a general-purpose processor, a graphics processor, a microcontroller, a microprocessor, or a digital signal processor.

It should be noted that as used herein, a "coupling" and a "connection" between two components, such as one component being "coupled" or "connected" to another component may refer to an electronic connection between two components, which may include but not limited to, by electronic wiring, through an electronic element (e.g., a resistor, a transistor), etc.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A processor, comprising:
   a sequencer, including:
     a scalar instruction decoder;
     a scalar processor;
     a vector instruction decoder,
     a local memory, and
     a scalar register file; and
   a plurality of columns of vector processing units coupled to the sequencer, wherein the sequencer is configured to:
   retrieve kernel information of a kernel, the kernel information including a number of instances of the kernel to fit in the processor, an address offset, a register index offset, and a number of columns of vector processing units that the kernel occupies;
   retrieve instructions of the kernel from an instruction cache, the instructions of the kernel including a plurality of instruction groups;

repeatedly execute decoded scalar instructions of each instruction group of the kernel decoded by the scalar instruction decoder successively by the scalar processor according to the number of instances of the kernel, with a first execution of the decoded scalar instructions using addresses in the local memory and scalar registers in the scalar register file specified by the kernel and with each repetition of execution using incremented addresses in the local memory with an increment amount being equal to the address offset multiplied by a respective repetition count and scalar registers with indexes incremented by the register index offset multiplied by the respective repetition count;

repeatedly decode vector instructions of each instruction group of the kernel successively by the vector instruction decoder according to the number of instances of the kernel, with a first vector instruction decoding using the scalar registers specified by the kernel and with each repetition of decoding using the scalar registers with indexes incremented by the register index offset multiplied by the respective repetition count; and dispatch a respective configuration to a respective column after the first vector instruction decoding and each repetition of decoding, with each respective configuration being generated after decoding the vector instructions of the instruction group a respective time and being dispatched to a respective column with an amount of space between two subsequent dispatches equal to the number of columns of vector processing units that the kernel occupies.

2. The processor of claim 1, wherein each column of vector processing units comprises a memory port configured to perform vector memory access operations, a switch box and a processing element configured to perform Single Instruction Multiple Threads (SIMT) data processing operations.

3. The processor of claim 1, wherein the sequencer further comprises adders to increment local memory addresses and scalar register indexes by the address offset multiplied by the respective repetition count and the register index offset multiplied by the respective repetition count, respectively, for each repetition of executing scalar instructions and decoding vector instructions.

4. The processor of claim 1, wherein each column of vector processing units comprises a processing element with a vector Arithmetic Logic Unit (ALU) configured to perform Single Instruction Multiple Threads (SIMT) data processing operations.

5. The processor of claim 1, wherein the sequencer further comprises a controller configured to execute scalar control flow instructions including repeat, jump, poll, and barrier.

6. The processor of claim 5, wherein the controller includes respective hardware execution units for each type of the scalar control flow instructions.

7. The processor of claim 5, wherein the controller further includes a Program Counter (PC) register, a column counter, a loop counter, and a column number register for executing a repeat instruction.

8. The processor of claim 1, wherein each vector processing unit of the plurality of columns of vector processing units comprises a configuration buffer sized to hold more than one configuration.

9. The processor of claim 1, wherein each column of vector processing units is configured to execute decoded vector instructions in an asynchronous manner with respect to the sequencer.

10. The processor of claim 1, wherein the kernel is a sequence of scalar and vector instructions with each instruction group including one or more scalar instructions and one or more vector instructions.

11. A method, comprising:

retrieving kernel information of a kernel by a sequencer, the kernel information including a number of instances of the kernel to fit in a processor, an address offset, a register index offset, and a number of columns of vector processing units that the kernel occupies;

retrieving, by using the sequencer, instructions of the kernel from an instruction cache, the instructions of the kernel including a plurality of instruction groups;

repeatedly executing decoded scalar instructions of each instruction group of the kernel successively according to the number of instances of the kernel, with a first execution of the decoded scalar instructions using local memory addresses and scalar registers specified by the kernel and with each repetition of execution using incremented addresses in a local memory with an increment amount being equal to the address offset multiplied by a respective repetition count and scalar registers with indexes incremented by the register index offset multiplied by the respective repetition count;

repeatedly decoding vector instructions of each instruction group of the kernel successively according to the number of instances of the kernel, with a first vector instruction decoding using the scalar registers specified by the kernel and with each repetition of decoding using the scalar registers with indexes incremented by the register index offset multiplied by the respective repetition count; and dispatching a respective configuration to a respective column after the first vector instruction decoding and each repetition of decoding, with each respective configuration being generated after decoding the vector instructions of the instruction group a respective time and being dispatched to a respective column with an amount of space between two subsequent dispatches equal to the number of columns of vector processing units that the kernel occupies.

12. The method of claim 11, wherein each column of vector processing units comprises a memory port configured to perform vector memory access operations, a switch box and a processing element configured to perform Single Instruction Multiple Threads (SIMT) data processing operations.

13. The method of claim 12, wherein incrementing local memory addresses and scalar register indexes are performed by adders adding the address offset multiplied by the respective repetition count and the register index offset multiplied by the respective repetition count, respectively, for each repetition of executing scalar instructions and decoding vector instructions.

14. The method of claim 11, wherein each column of vector processing units comprises a processing element with a vector Arithmetic Logic Unit (ALU) configured to perform Single Instruction Multiple Threads (SIMT) data processing operations.

15. The method of claim 11, further comprising asserting a valid bit for a selected column of the columns of vector processing units for a configuration directed to the selected column to be received by the selected column.

16. The method of claim 11, further comprising writing data, by a scalar processor executing a decoded scalar instruction, to a scalar register file shared by the scalar processor and a vector instruction decoder to pass the data to the vector instruction decoder.

17. The method of claim 11, further comprising executing a scalar control flow instruction to change execution flow of the sequencer.

18. The method of claim 17, wherein the scalar control flow instruction is selected from the group consisting of repeat, jump, poll, and barrier.

19. The method of claim 11, wherein each column of vector processing units executes decoded vector instructions in an asynchronous manner with respect to the sequencer.

20. The method of claim 11, wherein the kernel is a sequence of scalar and vector instructions with each instruction group including one or more scalar instructions and one or more vector instructions.

* * * * *